US012764015B1

(12) United States Patent
Wang et al.

(10) Patent No.: US 12,764,015 B1
(45) Date of Patent: *Oct. 13, 2026

(54) PHYSICAL LAYER ISSUE DETECTION BASED ON CLIENT-SIDE BEHAVIOR ASSESSMENTS

(71) Applicant: Juniper Networks, Inc., Sunnyvale, CA (US)

(72) Inventors: Jisheng Wang, Palo Alto, CA (US); Jacob Thomas, Saratoga, CA (US); Kush Shah, Santa Clara, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 43 days.

This patent is subject to a terminal disclaimer.

(21) Appl. No.: 18/635,456

(22) Filed: Apr. 15, 2024

Related U.S. Application Data

(63) Continuation of application No. 17/547,881, filed on Dec. 10, 2021, now Pat. No. 11,973,640.

(60) Provisional application No. 63/221,812, filed on Jul. 14, 2021.

(51) Int. Cl.
*H04L 41/0686* (2022.01)
*H04L 41/0631* (2022.01)
*H04L 41/0677* (2022.01)

(52) U.S. Cl.
CPC ........ *H04L 41/0686* (2013.01); *H04L 41/064* (2013.01); *H04L 41/0677* (2013.01)

(58) Field of Classification Search
CPC ............... H04L 41/0686; H04L 41/064; H04L 41/0677; H04L 41/0631; H04L 43/0811; H04L 41/16; H04W 84/12; H04W 88/08
See application file for complete search history.

(56) References Cited

U.S. PATENT DOCUMENTS 8,381,044 B2 * 2/2013 Narin ...................... H04L 41/16 709/224
9,106,518 B1 * 8/2015 Presotto .................. H04L 43/16
(Continued)

FOREIGN PATENT DOCUMENTS

WO 2005094000 A1 10/2005

OTHER PUBLICATIONS

Prosecution History from U.S. Appl. No. 17/547,881, dated Jan. 9, 2023 through Dec. 28, 2023, 149 pp.
(Continued)

*Primary Examiner* — Alex Tran
(74) *Attorney, Agent, or Firm* — Shumaker & Sieffert P.A.

(57) ABSTRACT

The network management system (NMS) assesses behavior data such as Ethernet error, speed flapping, cold restart, and/or cloud disconnect collected from a respective one of access points (APs) or other wired client-side devices at an edge of a wired network, and determines whether features of the behavior data are indicative of a bad cable issue at a particular port of a particular network device of the wired network to which the respective AP is connected via a cable. The particular network device may be a third-party network device from which the NMS does not receive behavior data. In the case of a bad cable issue being detected, the NMS outputs a bad cable notification including identification information of the particular port and the particular network device. The NMS enables client-side only, behavior-based bad cable detection at network devices that avoids network traffic disruptions caused by conventional cable tests.

19 Claims, 8 Drawing Sheets

(56) References Cited

U.S. PATENT DOCUMENTS 9,712,290 B2 7/2017 Callaghan
9,729,439 B2 8/2017 MeLampy et al.
9,729,682 B2 8/2017 Kumar et al.
9,736,016 B2 * 8/2017 Brandwine ........... H04L 41/064
9,762,485 B2 9/2017 Kaplan et al.
9,832,082 B2 11/2017 Dade et al.
9,871,748 B2 1/2018 Gosselin et al.
9,985,883 B2 5/2018 MeLampy et al.
10,200,264 B2 2/2019 Menon et al.
10,277,506 B2 4/2019 Timmons et al.
10,432,522 B2 10/2019 Kaplan et al.
10,678,721 B1 6/2020 Beserra et al.
10,756,983 B2 * 8/2020 Ratkovic ............... H04L 41/145
10,862,742 B2 12/2020 Singh
10,917,203 B2 2/2021 Wray et al.
10,958,537 B2 3/2021 Safavi
10,958,543 B2 3/2021 Dade et al.
10,958,585 B2 3/2021 Safavi
10,985,969 B2 4/2021 Safavi
10,992,543 B1 4/2021 Rachamadugu et al.
11,109,246 B2 * 8/2021 Kerpez ................. H04W 24/02
11,109,258 B2 * 8/2021 Kachemir ............. H04W 64/00
11,621,742 B2 * 4/2023 German ................... H04B 3/46 375/224
11,635,748 B2 * 4/2023 Gade .................. G05B 19/4185 700/19
12,212,451 B2 * 1/2025 Mortensen .......... H04L 41/0636
2007/0022331 A1 * 1/2007 Jamieson ............ G06F 11/0709 714/E11.207
2008/0181100 A1 * 7/2008 Yang ................... H04L 41/0681 370/216
2012/0005532 A1 * 1/2012 Li ....................... G06F 11/0709 714/E11.029
2013/0339515 A1 12/2013 Radhakrishnan
2014/0122140 A1 * 5/2014 Rijnders ............. G06F 11/1417 705/7.13
2015/0295802 A1 * 10/2015 Balakrishnan ...... H04L 41/0823 370/248
2015/0333998 A1 * 11/2015 Gopalakrishnan ...... H04L 41/16 370/244
2016/0204979 A1 7/2016 Benner et al.
2017/0230233 A1 8/2017 Sane
2019/0052518 A1 2/2019 Gal et al.
2019/0165988 A1 * 5/2019 Wang .................... H04L 41/065
2020/0134175 A1 * 4/2020 Marwah .................. G06F 9/542
2020/0267203 A1 8/2020 Jindal et al.
2020/0280508 A1 9/2020 Davey et al.
2020/0403890 A1 12/2020 McCulley et al.
2021/0044477 A1 2/2021 Singh
2021/0168084 A1 6/2021 Safavi
2021/0176143 A1 6/2021 Dade et al.
2021/0226855 A1 7/2021 Safavi
2021/0258239 A1 * 8/2021 Richards ............. H04L 12/4641
2021/0273845 A1 9/2021 Safavi
2021/0306201 A1 9/2021 Wang et al.
2021/0384941 A1 12/2021 German et al.
2023/0062982 A1 3/2023 Patterson et al.
2023/0139081 A1 5/2023 Viclizki et al.
2024/0045418 A1 2/2024 Ganju et al.

OTHER PUBLICATIONS

U.S. Appl. No. 17/547,881, filed Dec. 10, 2021, naming inventors Wang et al.

U.S. Appl. No. 18/612,830, filed Mar. 21, 2024, naming inventors Venkata et al.

* cited by examiner

PHYSICAL LAYER ISSUE DETECTION BASED ON CLIENT-SIDE BEHAVIOR ASSESSMENTS

This application is a continuation of U.S. patent application Ser. No. 17/547,881, filed 10 Dec. 2021, which claims the benefit of U.S. Provisional Patent Application No. 63/221,812, filed 14 Jul. 2021, the entire content of each application is incorporated herein by reference.

TECHNICAL FIELD

The disclosure relates generally to computer networks and, more specifically, to monitoring and diagnostics of computer networks and network systems.

BACKGROUND

Commercial premises or sites, such as offices, hospitals, airports, stadiums, or retail outlets, often install complex wireless network systems, including a network of wireless access points (APs), throughout the premises to provide wireless network services to one or more wireless client devices (or simply, "clients"). APs are physical, electronic devices that enable other devices to wirelessly connect to a wired network using various wireless networking protocols and technologies, such as wireless local area networking protocols conforming to one or more of the IEEE 802.11 standards (i.e., "WiFi"), Bluetooth/Bluetooth Low Energy (BLE), mesh networking protocols such as ZigBee or other wireless networking technologies. Many different types of wireless client devices, such as laptop computers, smartphones, tablets, wearable devices, appliances, and Internet of Things (IOT) devices, incorporate wireless communication technology and can be configured to connect to wireless access points when the device is in range of a compatible wireless access point in order to access a wired network. As the client devices move throughout the premises, they may automatically switch or "roam" from one wireless access point to another, in-range wireless access point, so as to provide the users with seamless network connectivity throughout the premises.

SUMMARY

In general, this disclosure describes techniques that enable a network management system to monitor and assess behavior data from access points (APs) and other wired client-side devices, e.g., IoT devices, in order to detect potential physical layer issues at third-party network devices to which the APs are connected within a wired network. In order to provide wireless network services to client devices and/or communicate over one or more wireless networks, APs and the other wired client-side devices at a site are connected, either directly or indirectly, to one or more network devices (e.g., switches, routers, or the like) of the wired network via Ethernet cables. Bad cable issues are common at the wired network edge as the APs and/or the wired IoT devices may be frequently moved (e.g., intentionally moved for upgrades, maintenance, or general cleaning or unintentionally bumped or jostled if positioned in high-traffic areas at the site) leading to loose, disconnected, broken, or otherwise non-functional Ethernet cables between the APs or IoT devices and the wired network devices.

According to the techniques of this disclosure, the network management system assesses behavior data such as Ethernet error, speed flapping, cold restart, and/or cloud disconnect collected from a particular one of the APs or the wired client-side devices, and determines whether features of the behavior data are indicative of a bad cable issue at a wired network device to which the particular AP is connected within the wired network. In some examples, the wired network device may be considered a "third-party" wired network device because the network management system does not receive, collect, or otherwise have access to behavior data from those wired network devices.

In some examples, the network management system includes a virtual network assistant (VNA) that implements an event processing platform for providing real-time insights and simplified troubleshooting for IT operations, and that automatically takes corrective action or provides recommendations to proactively address wireless network issues. According to the disclosed techniques, the VNA executes a bad cable detection engine configured to assess the different types of behavior data collected from each of the APs and other wired client-side devices. In some examples, the bad cable detection engine may be configured to apply a machine learning-based ("ML-based") model to the collected behavior data from a particular AP to determine whether features of the behavior data indicate a bad cable issue at a particular port of a particular network device to which the particular AP is connected within the wired network. In the case of a bad cable issue being detected, the VNA outputs a notification, e.g., to an administrator of an entity that owns or has access to the network device, with a recommended action to test and/or replace the cable connected to the particular port of the particular network device along with the necessary information to identify the particular port and the particular network device. In this way, the VNA executing the bad cable detection engine provides wired assurance for the wired network spanning from the APs or other wired client-side devices to the wired network devices at the wired network edge.

Conventionally, identifying a bad cable issue at the wired network edge requires a cable test during which high load packets are sent from a wired network device across a cable to an AP or other wired client-side device for approximately one minute and a readout is examined to determine whether the packets were successfully transmitted. This deterministic approach, however, stops all other traffic on the cable for the full minute while the cable test is run. As such, it is not feasible to run cable tests every day across potentially tens-of-thousands of cables that may be connected to the wired network devices. In addition, the cable test requires control of both sides of the cable (e.g., ownership or at least access to both the wired network device and the AP or wired client-side device.

The techniques of this disclosure provide one or more technical advantages and practical applications. For example, the techniques enable automatic detection of potential bad cable issues at "third-party" wired network devices based only on behavior data collected from the APs or other wired client-side devices. The disclosed techniques provide a probabilistic approach to bad cable detection that avoids network traffic disruptions and, thus, is scalable to enable frequent bad cable assessments for each of the potentially tens-of-thousands of cables connected to the wired network devices. In addition, the disclosed techniques enable client-side only, behavior-based bad cable detection, which is more applicable to the increasingly common situation in which the same entity does not own or have access to both the AP or wired client-side devices and the wired network devices. The disclosed techniques may further avoid the need for administrators to manually check the network devices and the potentially tens-of-thousands of cables for bad cable issues. For example, upon receipt of a bad cable notification from the VNA, the administrator associated with the network device may initiate a cable test at the port of the network device identified in the notification or, in some cases, the administrator may skip the cable test and instead immediately initiate a cable replacement at the port of the network device identified in the notification.

In one example, this disclosure describes a network management system that manages a plurality of client-side devices at an edge of a wired network, the plurality of client-side devices connected to one or more network devices of the wired network via respective cables. The network management system includes a memory storing behavior data received from the plurality of client-side devices; and one or more processors coupled to the memory and configured to: determine, based on the behavior data for a particular client-side device, one or more features of the behavior data over a window of time; detect, based on the one or more features of the behavior data over the window of time, a potential bad cable issue at a particular port of a particular network device to which the particular client-side device is connected via a cable; and output a bad cable notification including identification information of the particular port and the particular network device.

In another example, this disclosure describes a method comprising: receiving, by a network management system that manages a plurality of client-side devices at an edge of a wired network, behavior data from the plurality of client-side devices, wherein the plurality of client-side devices are connected to one or more network devices of the wired network via respective cables; determining, by the network management system, one or more features of the behavior data over a window of time based on the behavior data for a particular client-side device; detecting, by the network management system and based on the one or more features of the behavior data over the window of time, a potential bad cable issue at a particular port of a particular network device to which the particular client-side device is connected via a cable; and outputting, by the network management system, a bad cable notification including identification information of the particular port and the particular network device.

In another example, this disclosure describes a computer-readable storage medium comprising instructions that, when executed by a network management system that manages a plurality of client-side devices at an edge of a wired network, cause one or more processors of the network management system to receive behavior data from the plurality of client-side devices, wherein the plurality of client-side devices are connected to one or more network devices of the wired network via respective cables; determine, based on the behavior data for a particular client-side device, one or more features of the behavior data over a window of time; detect, based on the one or more features of the behavior data over the window of time, a potential bad cable issue at a particular port of a particular network device to which the particular client-side device is connected via a cable; and output a bad cable notification including identification information of the particular port and the particular network device.

The details of one or more examples of the techniques of this disclosure are set forth in the accompanying drawings and the description below. Other features, objects, and advantages of the techniques will be apparent from the description and drawings, and from the claims.

DETAILED DESCRIPTION

Figure 1A:
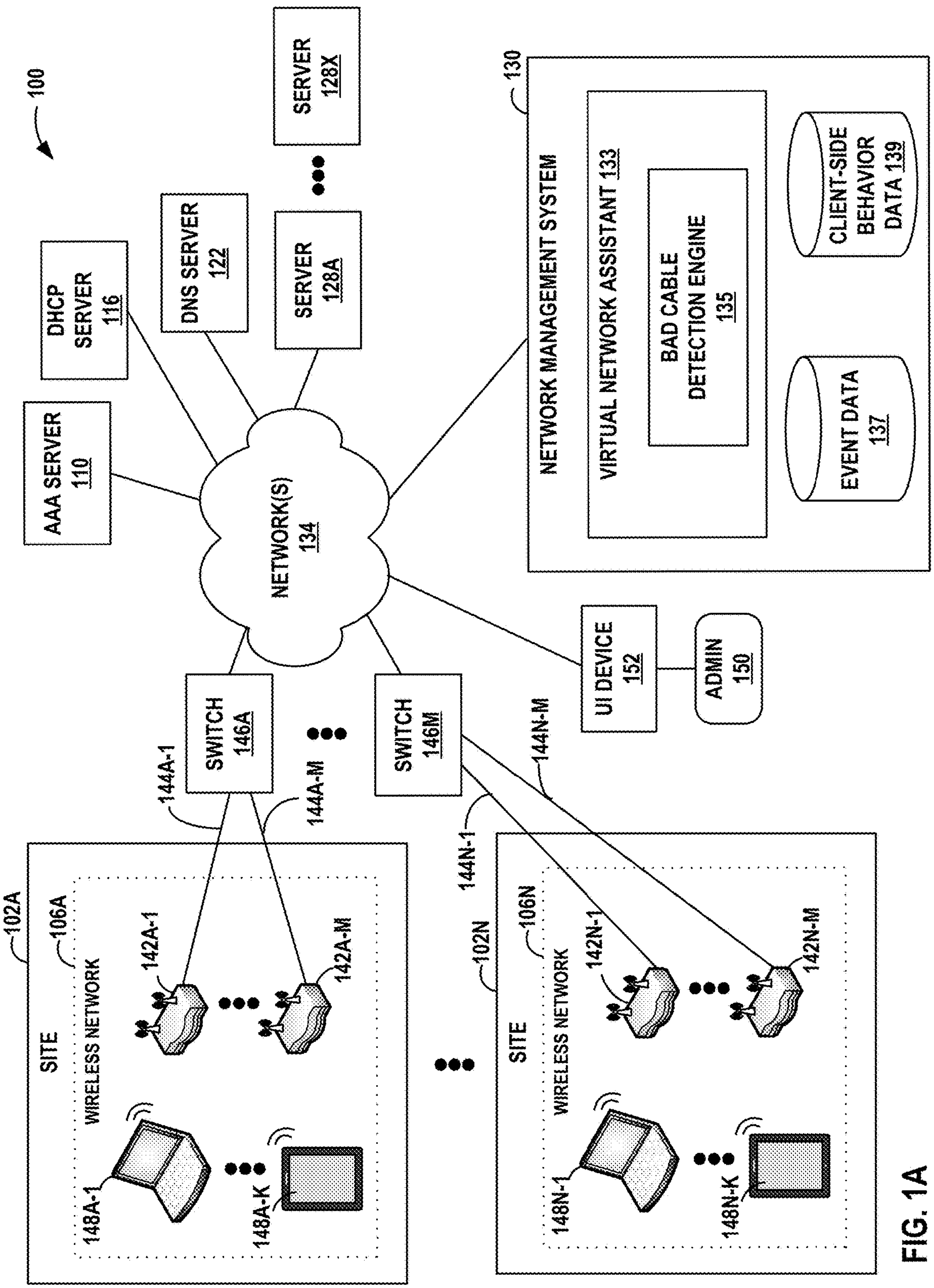
FIG. 1A is a block diagram of an example network system including a network management system in which a virtual network assistant (VNA) executes a bad cable detection engine configured to monitor and assess client-side behavior data to detect potential bad cable issues at network devices, in accordance with one or more techniques of this disclosure.

FIG. 1A is a block diagram of an example network system 100 including a network management system (NMS) 130 in which a virtual network assistant (VNA) 133 executes a bad cable detection engine 135 configured to monitor and assess client-side behavior data to detect potential bad cable issues at network devices, in accordance with one or more techniques of this disclosure. Example network system 100 includes a plurality sites 102A-102N at which a network service provider manages one or more wireless networks 106A-106N, respectively. Although in FIG. 1A each site 102A-102N is shown as including a single wireless network 106A-106N, respectively, in some examples, each site 102A-102N may include multiple wireless networks, and the disclosure is not limited in this respect.

Each site 102A-102N includes a plurality of wired client-side devices, such as access points (APs) 142 and IoT devices, within the wired network edge. For example, site 102A includes a plurality of APs 142A-1 through 142A-M. Similarly, site 102N includes a plurality of APs 142N-1 through 142N-M. Each AP 142 may be any type of wireless access point, including, but not limited to, a commercial or enterprise AP, a router, or any other device that is connected to the wired network and is capable of providing wireless network access to client devices within the site.

Each site 102A-102N also includes a plurality of client devices, otherwise known as user equipment devices (UEs), referred to generally as UEs 148, representing various wireless-enabled devices within each site. For example, a plurality of UEs 148A-1 through 148A-K are currently located at site 102A. Similarly, a plurality of UEs 148N-1 through 148N-K are currently located at site 102N. Each UE 148 may be any type of wireless client device, including, but not limited to, a mobile device such as a smart phone, tablet or laptop computer, a personal digital assistant (PDA), a wireless terminal, a smart watch, smart ring, or other wearable device. UEs 148 may also include wired client-side devices, e.g., IoT devices such as printers, security devices, environmental sensors, or any other device connected to the wired network and configured to communicate over one or more wireless networks 106.

In order to provide wireless network services to UEs 148 and/or communicate over the wireless networks 106, APs 142 and the other wired client-side devices at sites 102 are connected, either directly or indirectly, to one or more network devices (e.g., switches, routers, or the like) of the wired network via Ethernet cables. In the example of FIG. 1A, each of APs 142A-1 through 142A-M at site 102A are connected to a switch 146A via Ethernet cables 144A-1 through 144A-M, respectively, and each of APs 142N-1 through 142N-M at site 102N are connected to a switch 146M via Ethernet cables 144N-1 through 144N-M, respectively. Although illustrated in FIG. 1A as if all APs 142 of a given site 102 being connected to a single one of switches 146, in other examples, the APs and the other wired client-side devices of a given site may be connected to two or more switches within the wired network. Throughout this disclosure the APs 142 and other wired client-side devices at sites 102A-102N along with switches 146A through 146M are referred to as the wired network edge. In addition, throughout this disclosure, switches 146 may be considered "third-party" wired network devices as switches 146 may be owned and/or associated with different entities than APs 142 and the other wired client-side devices.

Example network system 100 also includes various networking components for providing networking services within the wired network including, as examples, an Authentication, Authorization and Accounting (AAA) server 110 for authenticating users and/or UEs 148, a Dynamic Host Configuration Protocol (DHCP) server 116 for dynamically assigning network addresses (e.g., IP addresses) to UEs 148 upon authentication, a Domain Name System (DNS) server 122 for resolving domain names into network addresses, a plurality of servers 128A-128X (collectively "servers 128") (e.g., web servers, databases servers, file servers and the like), and a network management system (NMS) 130. As shown in FIG. 1A, the various devices and systems of network 100 are coupled together via one or more network(s) 134, e.g., the Internet and/or an enterprise intranet. Each one of the servers 110, 116, 122 and/or 128, APs 142, UEs 148, switches 146, NMS 130, and any other servers or devices attached to or forming part of network system 100 may include a system log or an error log module wherein each one of these devices records the status of the device including normal operational status and error conditions.

In the example of FIG. 1A, NMS 130 is a cloud-based computing platform that manages wireless networks 106A-106N at one or more of sites 102A-102N. As further described herein, NMS 130 provides an integrated suite of management tools and implements various techniques of this disclosure. In general, NMS 130 may provide a cloud-based platform for wireless network data acquisition, monitoring, activity logging, reporting, predictive analytics, network anomaly identification, and alert generation. In some examples, NMS 130 outputs notifications, such alerts, alarms, graphical indicators on dashboards, log messages, text/SMS messages, email messages, and the like, and/or recommendations regarding wireless network issues to an administrator ("admin") 150 interacting with and/or operating user interface (UI) device 152. Additionally, in some examples, NMS 130 operates in response to configuration input received from admin 150 interacting with and/or operating UI device 152.

Admin 150 and UI device 152 may comprise IT personnel and an administrator computing device associated with one or more of sites 102 and/or switches 146 at the wired network edge. UI device 152 may be implemented as any suitable device for presenting output and/or accepting user input. For instance, UI device 152 may include a display. UI device 152 may be a computing system, such as a mobile or non-mobile computing device operated by a user and/or by administrator 150. UI device 152 may, for example, represent a workstation, a laptop or notebook computer, a desktop computer, a tablet computer, or any other computing device that may be operated by a user and/or present a user interface in accordance with one or more aspects of the present disclosure. UI device 152 may be physically separate from and/or in a different location than NMS 130 such that UI device 152 may communicate with NMS 130 via network 134 or other means of communication.

In some examples, NMS 130 monitors event data 137, e.g., one or more service level expectation (SLE) metrics, received from wireless networks 106A-106N at each site 102A-102N, respectively, and manages network resources, such as APs 142 at each site, to deliver a high-quality wireless experience to end users, IoT devices and clients at the site. For example, NMS 130 may include a virtual network assistant (VNA) 133 that implements an event processing platform for providing real-time insights and simplified troubleshooting for IT operations, and that automatically takes corrective action or provides recommendations to proactively address wireless network issues. VNA 133 may, for example, include an event processing platform configured to process hundreds or thousands of concurrent streams of event data 137 from sensors and/or agents associated with APs 142 and/or nodes within network 134. For example, VNA 133 of NMS 130 may include an underlying analytics and network error identification engine and alerting system in accordance with various examples described herein. The underlying analytics engine of VNA 133 may apply historical data and models to the inbound event streams to compute assertions, such as identified anomalies or predicted occurrences of events constituting network error conditions. Further, VNA 133 may provide real-time alerting and reporting to notify admin 150 via UI device 152 of any predicted events, anomalies, trends, and may perform root cause analysis and automated or assisted error remediation. In some examples, VNA 133 of NMS 130 may apply machine learning techniques to identify the root cause of error conditions detected or predicted from the streams of event data 137. If the root cause may be automatically resolved, VNA 133 invokes one or more corrective actions to correct the root cause of the error condition, thus automatically improving the underlying SLE metrics and also automatically improving the user experience.

Further example details of operations implemented by the VNA 133 of NMS 130 are described in U.S. application Ser. No. 14/788,489, filed Jun. 30, 2015, and entitled "Monitoring Wireless Access Point Events," U.S. application Ser. No. 16/835,757, filed Mar. 31, 2020, and entitled "Network System Fault Resolution Using a Machine Learning Model," U.S. application Ser. No. 16/279,243, filed Feb. 19, 2019, and entitled "Systems and Methods for a Virtual Network Assistant," U.S. application Ser. No. 16/237,677, filed Dec. 31, 2018, and entitled "Methods and Apparatus for Facilitating Fault Detection and/or Predictive Fault Detection," U.S. application Ser. No. 16/251,942, filed Jan. 18, 2019, and entitled "Method for Spatio-Temporal Modeling," and U.S. application Ser. No. 16/296,902, filed Mar. 8, 2019, and entitled "Method for Conveying AP Error Codes Over BLE Advertisements," all of which are incorporated herein by reference in their entirety.

In operation, NMS 130 observes, collects and/or receives event data 137, which may take the form of data extracted from messages, counters, and statistics, for example. In accordance with one specific implementation, a computing device is part of NMS 130. In accordance with other implementations, NMS 130 may comprise one or more computing devices, dedicated servers, virtual machines, containers, services, or other forms of environments for performing the techniques described herein. Similarly, computational resources and components implementing VNA 133 may be part of the NMS 130, may execute on other servers or execution environments, or may be distributed to nodes within network 134 (e.g., routers, switches, controllers, gateways, and the like).

In accordance with one or more techniques of this disclosure, NMS 130 is configured to monitor and assess behavior data 139 from APs 142 and the other wired client-side devices, e.g., IoT devices, in order to detect potential physical layer (i.e., OSI Layer 1 or L1) issues at network devices, e.g., switches 146, to which the APs 142 and other wired client-side devices are connected via Ethernet cables 144 within the wired network edge. In this disclosure, switches 146 and/or other wired network devices within the wired network edge may be considered "third-party" wired network devices because they are owned and/or associated with different entities than APs 142 and the other wired client-side devices such that NMS 130 does not receive, collect, or otherwise have access to behavior data from switches 146 or other wired network devices. In some examples, client-side behavior data 139 may be a subset of event data 137 received from APs 142 and the other wired client-side devices at sites 102.

Bad cable issues are common at the wired network edge as APs 142 and/or the other wired client-side devices may be frequently moved (e.g., intentionally moved for upgrades, maintenance, or general cleaning or unintentionally bumped or jostled if positioned in high-traffic areas at the site) leading to loose, disconnected, broken, or otherwise non-functional Ethernet cables 144 between the APs 142 or the other wired client-side devices and switches 146. Conventionally, identifying a bad cable issue at the wired network edge requires a cable test during which high load packets are sent from a wired network device across a cable to an AP or other wired client-side device for approximately one minute and a readout is examined to determine whether the packets were successfully transmitted. This deterministic approach, however, stops all other traffic on the cable for the full minute while the cable test is run. As such, it is not feasible to run cable tests every day across potentially tens-of-thousands of cables that may be connected to the wired network devices. In addition, the cable test requires control of both sides of the cable (e.g., ownership or at least access to both the wired network device and the AP or wired client-side device.

According to the techniques of this disclosure, NMS 130 assesses client-side behavior data 139 such as Ethernet error, speed flapping, cold restart, and/or cloud disconnect collected from a particular one of APs 142 or the other wired client-side devices, and determines whether features of behavior data 139 are indicative of a bad cable issue at a wired network device, e.g., one of switches 146, to which the particular client-side device is connected via a cable, e.g., one of Ethernet cables 144. Behavior data 139 for the particular AP or other wired client-side device includes data representative of different types of behavior observed at the particular client-side device. For example, the different types of behavior include one or more of error packets on an interface of the particular client-side device to which the cable is connected, negotiated link speed flapping over the cable, cold restart of the particular client-side device due to a power outage, or disconnection of the particular client-side device from cloud-based services with self-recovery.

VNA 133 executes a bad cable detection engine 135 configured to assess the different types of behavior data 139 collected from each of the APs 142 and other wired client-side devices at sites 102. For example, bad cable detection engine 135 is configured to determine one or more features of behavior data 139 collected for a particular one of APs 142, e.g., AP 142A-1, over a window of time (e.g., during a last 7 days, or a last 4 days, or a last X days, where X is an integer). The features may include one or more of a quantity, a frequency, or a variance over the window of time for each type of behavior data 139. Bad cable detection engine 135 is then configured to detect, based on the one or more features over the window of time, a potential bad cable issue at a particular port of a particular network device, e.g., switch 146A, to which client-side device 142A-1 is connected via Ethernet cable 144A-1.

In some examples, bad cable detection engine 135 may be configured to apply the collected behavior data 139 from AP 142A-1 to a machine learning-based (ML-based) model as input, and determine, as output from the ML-based model, whether features of the behavior data 139 indicate a bad cable issue at the particular port of switch 146A to which AP 142A-1 is connected via Ethernet cable 144A-1. For example, the ML-based model may comprise a supervised ML model that is trained using training data comprising pre-collected, labeled behavior data received from APs and/or other wired client-side devices. The training data may include sets of behavior data each labeled as being indicative of a bad cable issue or no bad cable issue. In this example, the ML-based model is trained using labeled sets of behavior data because the features of the pre-collected behavior data may also be indicative of other network error conditions. In other examples, the ML-based model may comprise an unsupervised ML model.

In the case of a bad cable issue being detected, VNA 133 outputs a bad cable notification including identification information of the particular port and the particular switch 146A, e.g., to administrator 150 via UI device 152 of an entity that owns or has access to switch 146A. In some examples, VNA 133 may determine a recommended action based on the detected bad cable issue. The bad cable notification may then include the recommended action to test and/or replace Ethernet cable 144A-1 connected to the particular port of switch 146A. In this way, VNA 133 executing bad cable detection engine 135 provides wired assurance for the wired network spanning from the APs 142 or other wired client-side devices to the wired network devices 146 at the wired network edge.

The techniques of this disclosure provide one or more technical advantages and practical applications. For example, the techniques enable automatic detection of potential bad cable issues at "third-party" wired network devices based only on behavior data collected from the APs or other wired client-side devices. The disclosed techniques provide a probabilistic approach to bad cable detection that avoids network traffic disruptions and, thus, is scalable to enable frequent bad cable assessments for each of the potentially tens-of-thousands of cables connected to the wired network devices. In addition, the disclosed techniques enable client-side only, behavior-based bad cable detection, which is more applicable to the increasingly common situation in which the same entity does not own or have access to both the AP or wired client-side devices and the wired network devices. The disclosed techniques may further avoid the need for administrators to check the network devices and the potentially tens-of-thousands of cables for bad cable issues. For example, upon receipt of a bad cable notification from the VNA 133 via UI device 152, administrator 150 may initiate a cable test at the port of the network device identified in the notification or, in some cases, administrator 150 may skip the cable test and instead immediately initiate a cable replacement at the port of the network device identified in the notification.

Although the techniques of the present disclosure are described in this example as performed by NMS 130, it shall be understood that techniques described herein may be performed by any other computing device(s), system(s), and/or server(s), and that the disclosure is not limited in this respect. For example, one or more computing device(s) configured to execute the functionality of the techniques of this disclosure may reside in a dedicated server or be included in any other server in addition to or other than NMS 130, or may be distributed throughout network 100, and may or may not form a part of NMS 130.

Figure 1B:
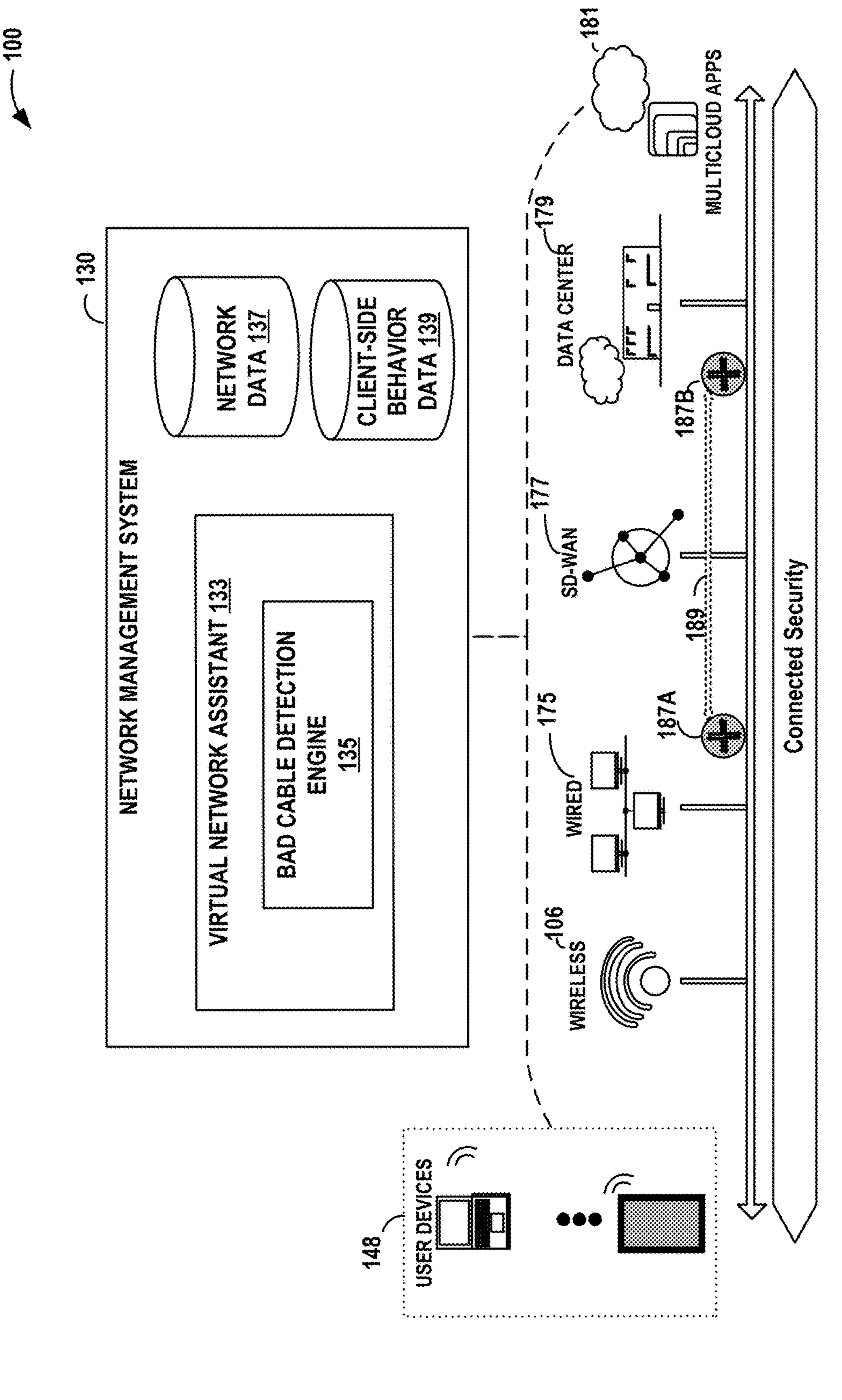
FIG. 1B is a block diagram illustrating further example details of the network system of FIG. 1A.

FIG. 1B is a block diagram illustrating further example details of the network system of FIG. 1A. In this example, FIG. 1B illustrates NMS 130 configured to operate according to an artificial intelligence/machine-learning-based computing platform providing comprehensive automation, insight, and assurance (WiFi Assurance, Wired Assurance and WAN assurance) spanning from wireless network 106 and wired LAN 175 at the network edge (far left of FIG. 1B) to cloud-based application services 181 hosted by computing resources within data centers 179 (far right of FIG. 1B).

As described herein, NMS 130 provides an integrated suite of management tools and implements various techniques of this disclosure. In general, NMS 130 may provide a cloud-based platform for wireless network data acquisition, monitoring, activity logging, reporting, predictive analytics, network anomaly identification, and alert generation. For example, network management system 130 may be configured to proactively monitor and adaptively configure network 100 so as to provide self-driving capabilities. Moreover, VNA 133 includes a natural language processing engine to provide AI-driven support and troubleshooting, anomaly detection, AI-driven location services, and AI-drive RF optimization with reinforcement learning.

As illustrated in the example of FIG. 1B, AI-driven NMS 130 also provides configuration management, monitoring and automated oversight of software defined wide-area network (SD-WAN) 177, which operates as an intermediate network communicatively coupling wireless networks 106 and wired LANs 175 to data centers 179 and application services 181. In general, SD-WAN 177 provides seamless, secure, traffic-engineered connectivity between "spoke" routers 187A of edge wired networks 175 hosting wireless networks 106, such as branch or campus networks, to "hub" routers 187B further up the cloud stack toward cloud-based application services 181. SD-WAN 177 often operates and manages an overlay network on an underlying physical Wide-Area Network (WAN), which provides connectivity to geographically separate customer networks. In other words, SD-WAN 177 extends Software-Defined Networking (SDN) capabilities to a WAN and allows network(s) to decouple underlying physical network infrastructure from virtualized network infrastructure and applications such that the networks may be configured and managed in a flexible and scalable manner.

In some examples, underlying routers of SD-WAN 177 may implement a stateful, session-based routing scheme in which the routers 187A, 187B dynamically modify contents of original packet headers sourced by user devices 148 to steer traffic along selected paths, e.g., path 189, toward application services 181 without requiring use of tunnels and/or additional labels. In this way, routers 177A, 177B may be more efficient and scalable for large networks since the use of tunnel-less, session-based routing may enable routers 177A, 177B to achieve considerable network resources by obviating the need to perform encapsulation and decapsulation at tunnel endpoints. Moreover, in some examples, each router 177A, 177B may independently perform path selection and traffic engineering to control packet flows associated with each session without requiring use of a centralized SDN controller for path selection and label distribution. In some examples, routers 177A, 177B implement session-based routing as Secure Vector Routing (SVR), provided by Juniper Networks, Inc.

Additional information with respect to session-based routing and SVR is described in U.S. Pat. No. 9,729,439, entitled "COMPUTER NETWORK PACKET FLOW CONTROLLER," and issued on Aug. 8, 2017; U.S. Pat. No. 9,729,682, entitled "NETWORK DEVICE AND METHOD FOR PROCESSING A SESSION USING A PACKET SIGNATURE," and issued on Aug. 8, 2017; U.S. Pat. No. 9,762,485, entitled "NETWORK PACKET FLOW CONTROLLER WITH EXTENDED SESSION MANAGEMENT," and issued on Sep. 12, 2017; U.S. Pat. No. 9,871,748, entitled "ROUTER WITH OPTIMIZED STATISTICAL FUNCTIONALITY," and issued on Jan. 16, 2018; U.S. Pat. No. 9,985,883, entitled "NAME-BASED ROUTING SYSTEM AND METHOD," and issued on May 29, 2018; U.S. Pat. No. 10,200,264, entitled "LINK STATUS MONITORING BASED ON PACKET LOSS DETECTION," and issued on Feb. 5, 2019; U.S. Pat. No. 10,277,506, entitled "STATEFUL LOAD BALANCING IN A STATELESS NETWORK," and issued on Apr. 30, 2019; U.S. Pat. No. 10,432,522, entitled "NETWORK PACKET FLOW CONTROLLER WITH EXTENDED SESSION MANAGEMENT," and issued on Oct. 1, 2019; and U.S. Patent Application Publication No. 2020/0403890, entitled "IN-LINE PERFORMANCE MONITORING," published on Dec. 24, 2020, the entire content of each of which is incorporated herein by reference in its entirety.

In some examples, AI-driven NMS 130 may enable intent-based configuration and management of network system 100, including enabling construction, presentation, and execution of intent-driven workflows for configuring and managing devices associated with wireless networks 106, wired LAN networks 175, and/or SD-WAN 177. For example, declarative requirements express a desired configuration of network components without specifying an exact native device configuration and control flow. By utilizing declarative requirements, what should be accomplished may be specified rather than how it should be accomplished. Declarative requirements may be contrasted with imperative instructions that describe the exact device configuration syntax and control flow to achieve the configuration. By utilizing declarative requirements rather than imperative instructions, a user and/or user system is relieved of the burden of determining the exact device configurations required to achieve a desired result of the user/system. For example, it is often difficult and burdensome to specify and manage exact imperative instructions to configure each device of a network when various different types of devices from different vendors are utilized. The types and kinds of devices of the network may dynamically change as new devices are added and device failures occur. Managing various different types of devices from different vendors with different configuration protocols, syntax, and software versions to configure a cohesive network of devices is often difficult to achieve. Thus, by only requiring a user/system to specify declarative requirements that specify a desired result applicable across various different types of devices, management and configuration of the network devices becomes more efficient. Further example details and techniques of an intent-based network management system are described in U.S. Pat. No. 10,756,983, entitled "Intent-based Analytics," and U.S. Pat. No. 10,992,543, entitled "Automatically generating an intent-based network model of an existing computer network," each of which is hereby incorporated by reference.

In accordance with the techniques described in this disclosure, NMS 130 enables VNA 133 to execute bad cable detection engine 135 configured to assess different types of behavior data 139 collected from each of the APs 142 and other wired client-side devices at the edge of wired LAN 175 and wireless networks 106. For example, bad cable detection engine 135 is configured to determine one or more features of behavior data 139 collected for a particular client-side device over a window of time, and detect, based on the one or more features over the window of time, a potential bad cable issue at a particular port of a particular network device within wired LAN 175 to which the particular client-side device is connected via a cable. VNA 133 then outputs a bad cable notification including identification information of the particular port and the particular network device within wired LAN 175, e.g., to an administrator associated with the particular network device. In this way, VNA 133 provides wired assurance for the wired network spanning from the APs or other wired client-side devices within wireless network 106 to the wired network devices within wired LAN 175 at the wired network edge.

Figure 2:
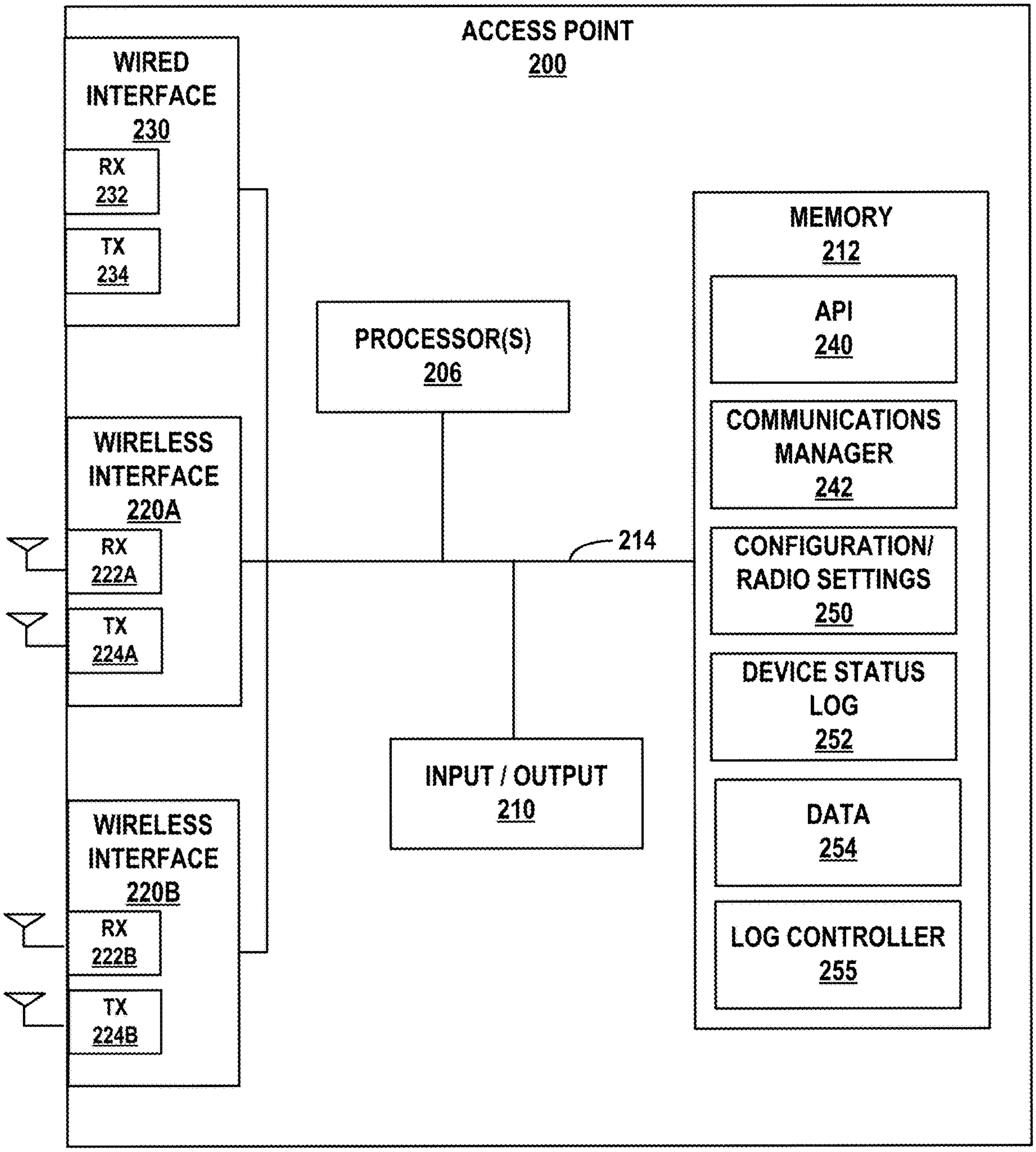
FIG. 2 is a block diagram of an example access point device, in accordance with one or more techniques of this disclosure.

FIG. 2 is a block diagram of an example access point (AP) device 200 configured in accordance with one or more techniques of this disclosure. Example access point 200 shown in FIG. 2 may be used to implement any of APs 142 as shown and described herein with respect to FIG. 1A. Access point 200 may comprise, for example, a Wi-Fi, Bluetooth and/or Bluetooth Low Energy (BLE) base station or any other type of wireless access point.

In the example of FIG. 2, access point 200 includes a wired interface 230, wireless interfaces 220A-220B one or more processor(s) 206, memory 212, and input/output 210, coupled together via a bus 214 over which the various elements may exchange data and information. Wired interface 230 represents a physical network interface and includes a receiver 232 and a transmitter 234 for sending and receiving network communications, e.g., packets. Wired interface 230 couples, either directly or indirectly, access point 200 to a wired network device, such as one of switches 146 of FIG. 1A, within the wired network via a cable, such as one of Ethernet cables 144 of FIG. 1A.

First and second wireless interfaces 220A and 220B represent wireless network interfaces and include receivers 222A and 222B, respectively, each including a receive antenna via which access point 200 may receive wireless signals from wireless communications devices, such as UEs 148 of FIG. 1A. First and second wireless interfaces 220A and 220B further include transmitters 224A and 224B, respectively, each including transmit antennas via which access point 200 may transmit wireless signals to wireless communications devices, such as UEs 148 of FIG. 1A. In some examples, first wireless interface 220A may include a Wi-Fi 802.11 interface (e.g., 2.4 GHz and/or 5 GHz) and second wireless interface 220B may include a Bluetooth interface and/or a Bluetooth Low Energy (BLE) interface.

Processor(s) 206 are programmable hardware-based processors configured to execute software instructions, such as those used to define a software or computer program, stored to a computer-readable storage medium (such as memory 212), such as non-transitory computer-readable mediums including a storage device (e.g., a disk drive, or an optical drive) or a memory (such as Flash memory or RAM) or any other type of volatile or non-volatile memory, that stores instructions to cause the one or more processors 206 to perform the techniques described herein.

Memory 212 includes one or more devices configured to store programming modules and/or data associated with operation of access point 200. For example, memory 212 may include a computer-readable storage medium, such as non-transitory computer-readable mediums including a storage device (e.g., a disk drive, or an optical drive) or a memory (such as Flash memory or RAM) or any other type of volatile or non-volatile memory, that stores instructions to cause the one or more processor(s) 206 to perform the techniques described herein.

In this example, memory 212 stores executable software including an application programming interface (API) 240, a communications manager 242, configuration settings 250, a device status log 252 and data storage 254. Device status log 252 includes a list of events specific to access point 200. The events may include a log of both normal events and error events such as, for example, memory status, reboot or restart events, crash events, cloud disconnect with self-recovery events, low link speed or link speed flapping events, Ethernet port status, Ethernet interface packet errors, upgrade failure events, firmware upgrade events, configuration changes, etc., as well as a time and date stamp for each event. Log controller 255 determines a logging level for the device based on instructions from NMS 130. Data 254 may store any data used and/or generated by access point 200, including data collected from UEs 148, such as data used to calculate one or more SLE metrics, that is transmitted by access point 200 for cloud-based management of wireless networks 106A by NMS 130.

Input/output (I/O) 210 represents physical hardware components that enable interaction with a user, such as buttons, a display, and the like. Although not shown, memory 212 typically stores executable software for controlling a user interface with respect to input received via I/O 210.

Communications manager 242 includes program code that, when executed by processor(s) 206, allow access point 200 to communicate with UEs 148 and/or network(s) 134 via any of interface(s) 230 and/or 220A-220C. Configuration settings 250 include any device settings for access point 200 such as radio settings for each of wireless interface(s) 220A-220C. These settings may be configured manually or may be remotely monitored and managed by NMS 130 to optimize wireless network performance on a periodic (e.g., hourly or daily) basis.

As described herein, AP device 200 may measure and report network event data, including behavior data, from status log 252 to NMS 130. The SLE-related data may include various parameters indicative of the performance and/or status of the wireless network. The parameters may be measured and/or determined by one or more of the UE devices and/or by one or more of the APs 200 in a wireless network. NMS 130 determines one or more SLE metrics and stores the SLE metrics as event data 139 (FIG. 1A) based on the SLE-related data received from the APs in a wireless network. The behavior data may include data representative of different types of behavior observed at AP device 200. For example, the different types of behavior may include one or more of error packets on wired interface 130 connected to a network device via a cable, negotiated link speed flapping over the cable, cold restart of AP device 200 due to a power outage, or disconnection of AP 200 from cloud-based services with subsequent self-recovery. NMS 130 identifies the relevant behavior data from the network event data received from the APs in a wireless network, and stores the behavior data as client-side behavior data 139 (FIG. 1A).

Figure 3:
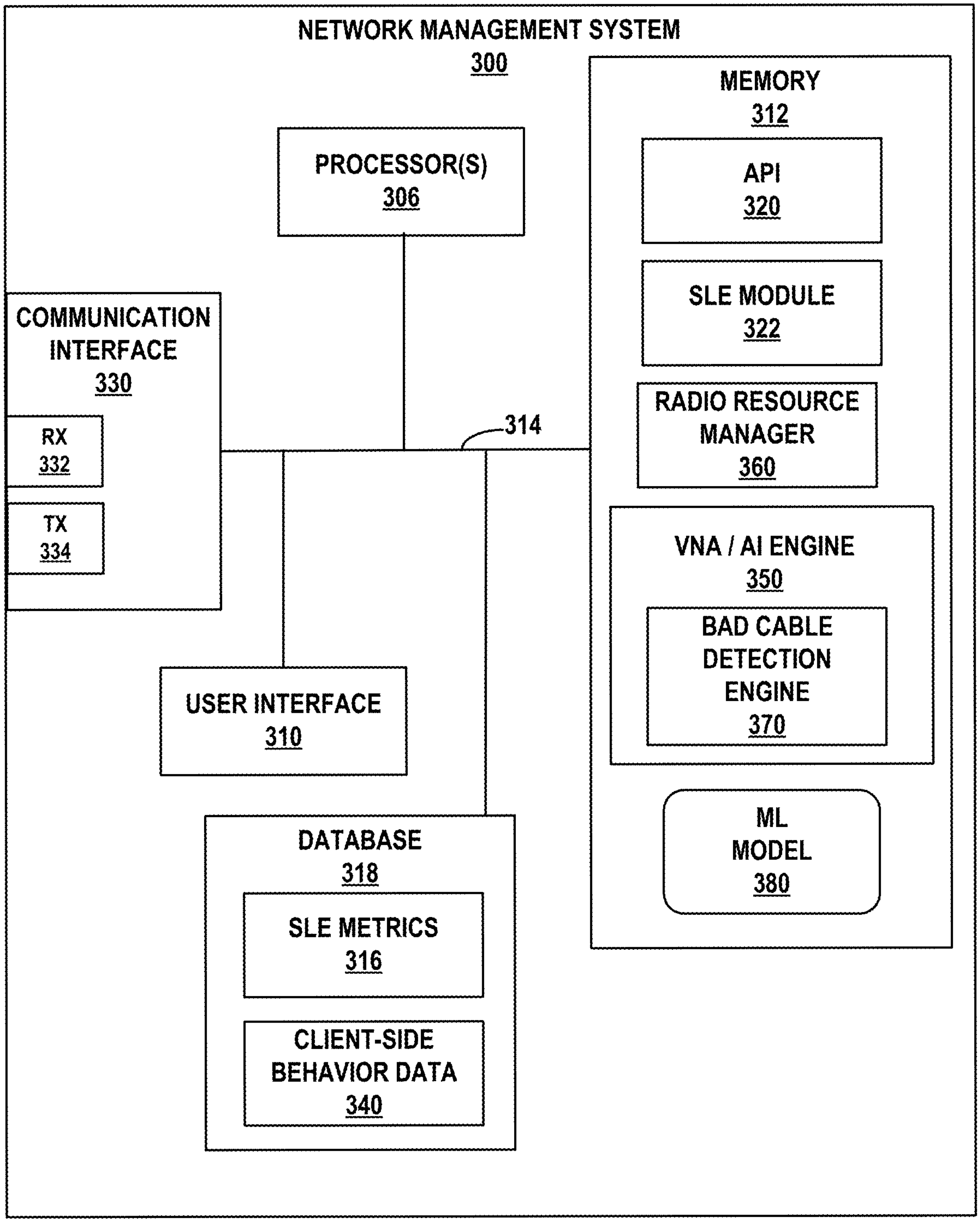
FIG. 3 is a block diagram of an example network management system having a bad cable detection engine configured to monitor and assess client-side behavior data to detect potential bad cable issues at network devices, in accordance with one or more techniques of this disclosure.

FIG. 3 is a block diagram of an example network management system (NMS) 300 having a bad cable detection engine 370 configured to monitor and assess client-side behavior data 340 to detect potential bad cable issues at network devices, in accordance with one or more techniques of this disclosure. NMS 300 may be used to implement, for example, NMS 130 in FIG. 1A. In such examples, NMS 300 is responsible for monitoring and management of one or more wireless networks 106A-106N at sites 102A-102N, respectively.

NMS 300 includes a communications interface 330, one or more processor(s) 306, a user interface 310, a memory 312, and a database 318. The various elements are coupled together via a bus 314 over which the various elements may exchange data and information. In some examples, NMS 300 receives event data from APs 142 or other wired client-side devices, which may be used to calculate one or more SLE metrics and/or identify relevant client-side behavior, and analyzes this data for cloud-based management of wireless networks 106A-106N. The event data is stored as, for example, SLE metrics 316 in database 318 and the subset of the event data identified as relevant client-side behavior is stored as client-side behavior data 340 in database 318. In some examples, NMS 300 may be part of another server shown in FIG. 1A or a part of any other server.

Processor(s) 306 execute software instructions, such as those used to define a software or computer program, stored to a computer-readable storage medium (such as memory 312), such as non-transitory computer-readable mediums including a storage device (e.g., a disk drive, or an optical drive) or a memory (such as Flash memory or RAM) or any other type of volatile or non-volatile memory, that stores instructions to cause the one or more processors 306 to perform the techniques described herein.

Communications interface 330 may include, for example, an Ethernet interface. Communications interface 330 couples NMS 300 to a network and/or the Internet, such as any of network(s) 134 as shown in FIG. 1A, and/or any local area networks.

Communications interface 330 includes a receiver 332 and a transmitter 334 by which NMS 300 receives/transmits data and information to/from any of APs 142, servers 110, 116, 122, 128 and/or any other devices or systems forming part of network 100 such as shown in FIG. 1A. In some scenarios described herein in which network 100 includes "third-party" wired network devices, e.g., switches 146, that are owned and/or associated with different entities than APs 142 and the other wired client-side devices at sites 102, NMS 300 does not receive, collect, or otherwise have access to event or behavior data from the third-party wired network devices.

The data and information received by NMS 300 may include, for example, SLE related or event log data received from APs 142 used by NMS 300 to remotely monitor the performance of wireless networks 106A-106N. In accordance with the disclosed techniques, the data and information received by NMS 300 may also include client-side behavior data received from APs 142 and/or the other wired client-side devices at sites 102A-102N. NMS 300 may further transmit data via communications interface 330 to any of network devices such as APs 142 at any of network sites 102A-102N and/or UI device 152 of administrator 150 to remotely manage wireless networks 106A-106N.

Memory 312 includes one or more devices configured to store programming modules and/or data associated with operation of NMS 300. For example, memory 312 may include a computer-readable storage medium, such as a non-transitory computer-readable medium including a storage device (e.g., a disk drive, or an optical drive) or a memory (such as Flash memory or RAM) or any other type of volatile or non-volatile memory, that stores instructions to cause the one or more processor(s) 306 to perform the techniques described herein.

In this example, memory 312 includes an API 320, an SLE module 322, a virtual network assistant (VNA)/AI engine 350, and a radio resource management (RRM) engine 360. In accordance with the disclosed techniques, VNA/AI engine 350 includes bad cable detection engine 370 that, in some examples, applies a ML model 380 to client-side behavior data 340 collected from a particular AP to determine whether features of the behavior data indicate a bad cable issue at a particular port of a particular network device to which the particular AP is connected via a cable. NMS 300 may also include any other programmed modules, software engines and/or interfaces configured for remote monitoring and management of wireless networks 106A-106N, including remote monitoring and management of any of APs 142/200 or other wired client-side devices.

SLE module 322 enables set up and tracking of thresholds for SLE metrics for each network 106A-106N. SLE module 322 further analyzes SLE-related data collected by APs, such as any of APs 142 from UEs in each wireless network 106A-106N. For example, APs 142A-1 through 142A-N collect SLE-related data from UEs 148A-1 through 148A-N currently connected to wireless network 106A. This data is transmitted to NMS 300, which executes by SLE module 322 to determine one or more SLE metrics for each UE 148A-1 through 148A-N currently connected to wireless network 106A. This data, in addition to any network data collected by one or more APs 142A-1 through 142A-N in wireless network 106A, is transmitted to NMS 300 and stored as, for example, SLE metrics 316 in database 318.

RRM engine 360 monitors one or more metrics for each site 102A-102N in order to learn and optimize the RF environment at each site. For example, RRM engine 360 may monitor the coverage and capacity SLE metrics for a wireless network 106 at a site 102 in order to identify potential issues with SLE coverage and/or capacity in the wireless network 106 and to make adjustments to the radio settings of the access points at each site to address the identified issues. For example, RRM engine may determine channel and transmit power distribution across all APs 142 in each network 106A-106N. For example, RRM engine 360 may monitor events, power, channel, bandwidth, and number of clients connected to each AP. RRM engine 360 may further automatically change or update configurations of one or more APs 142 at a site 102 with an aim to improve the coverage and capacity SLE metrics and thus to provide an improved wireless experience for the user.

VNA/AI engine 350 analyzes data received from APs 142/200 as well as its own data to identify when undesired to abnormal states are encountered in one of wireless networks 106A-106N. For example, VNA/AI engine 350 may identify the root cause of any undesired or abnormal states, e.g., any poor SLE metric(s) at one or more of wireless network 106A-106N. In addition, VNA/AI engine 350 may automatically invoke one or more corrective actions intended to address the identified root cause(s) of one or more poor SLE metrics. Examples of corrective actions that may be automatically invoked by VNA/AI engine 350 may include, but are not limited to, invoking RRM 360 to reboot one or more APs, adjusting/modifying the transmit power of a specific radio in a specific AP, adding SSID configuration to a specific AP, changing channels on an AP or a set of APs, etc. The corrective actions may further include restarting a switch and/or a router, invoking downloading of new software to an AP, switch, or router, etc. These corrective actions are given for example purposes only, and the disclosure is not limited in this respect. If automatic corrective actions are not available or do not adequately resolve the root cause, VNA/AI engine 350 may proactively provide a notification including recommended corrective actions to be taken by IT personnel to address the network error.

In accordance with one or more techniques of this disclosure, VNA/AI engine 350 further analyzes client-side behavior data 340 received from APs 142/200 and other wired client-side devices, e.g., IoT devices, in order to detect potential physical layer (i.e., OSI Layer 1 or L1) issues at network devices, e.g., switches 146, to which the APs 142 and other wired client-side devices are connected via Ethernet cables 144 within the wired network edge. VNA/AI engine 350 executes a bad cable detection engine 370 configured to assess different types of behavior data 340 collected from each of the APs 142 and other wired client-side devices at sites 102. More specifically, bad cable detection engine 370 is configured to determine one or more features of behavior data 340 collected for a particular client-side device (e.g., one of APs 142 or a wired IoT device) over a window of time. In some examples, the window of time may be a number of days, e.g., 7 days, 4 days, or X days where X is an integer). Bad cable detection engine 370 is then configured to detect, based on the one or more features over the window of time, a potential bad cable issue at a particular port of a particular network device to which the particular client-side device is connected via a cable.

Behavior data 340 for the particular client-side device includes data representative of different types of behavior observed at the particular client-side device. For example, the different types of behavior include one or more of error packets on an interface of the particular client-side device to which the cable is connected, negotiated link speed flapping over the cable, cold restart of the particular client-side device due to a power outage, or disconnection of the particular client-side device from cloud-based services with self-recovery. The features of behavior data 340 that may be used for the probability bad cable detection approach described herein may include one or more of a quantity, a frequency, or a variance over the window of time for each type of behavior.

In one example, behavior data 340 is representative of error packets on an interface of the particular client-side device to which the cable is connected. Bad cable detection engine 370 may assess a plurality of different types of interface packet errors from behavior data 340 and identify relevant error packets that are indicative of one or more types of interface packet errors that are more relevant to the bad cable issue than the other types of interface packet errors. The different types of interface packet errors may include rx_undersize_errors, rx_oversize_errors, rx_jabber_errors, rx_alignment_errors, rx_fcs_errors, rx_fragment_errors, rx_symbol_errors, rx_overrun_error. Some errors, like rx_fcx_errors, comprise the relevant error packets that are more relevant to the bad cable issue than the other errors. In examples where bad cable detection engine 370 uses ML model 380, the one or more types of the interface packet errors that are more relevant to the bad cable issue may be learned automatically via a machine learning-based feature correlation analysis. Continuing the above example, bad cable detection engine 370 may determine one or more features of the error packet behavior, including determining a percentage of packets identified as error packets on the interface of the particular client-side device during the window of time, and determining a percentage of packets identified as relevant error packets on the interface of the particular client-side device during the window of time.

In another example, behavior data 340 is representative of negotiated link speed flapping in which link speed over the cable is jumping between a low link speed and a negotiated maximum link speed. Once the cable is plugged between the particular client-side device and the wired network device, the particular client-side device negotiates a maximum link speed with the wired network device, e.g., 100 Mbps, 1 Gbps, or the like. Consistent low speed over the cable (e.g., 100 Mbps in the case where the negotiated link speed is 1 Gbps) may indicate physical layer or L1 issues, including but not limited to bad cable. However, negotiated link speed flapping on the cable (e.g., the link speed jumping between 100 Mbps and 1 Gbps) is more indicative of a bad cable issue. Bad cable detection engine 370 may determine one or more features of the negotiated link speed flapping behavior, including determining a number of link speed flaps over the cable during the window of time, and determining an average, a minimum, and a maximum interval time between the link speed flaps over the cable during the window of time.

In a further example, behavior data 340 is representative of cold restart of the particular client-side device due to a power outage. The particular client-side device draws power via the cable from the particular port of the particular network device such that a bad cable issue may cause the particular client-side device to reboot or restart due to a power outage. Frequent cold restarts of the particular client-side device are indicative of a bad cable issue. Bad cable detection engine 370 may determine one or more features of the cold restart behavior, including determining a number of cold restarts of the particular client-side device during the window of time, and determining a variance of interval time between the cold restarts of the particular client-side device during the window of time. For example, bad cable detection engine 370 may determine whether the variance of interval time indicates a burst pattern of cold restarts or a smooth pattern of cold restarts.

In situations where multiple client-side devices are connected to respective ports of the same particular network device via the respective cables, one particular client-side device observed to be frequently cold restarting while the other client-side devices are not, may be indicative of a bad cable issue. For example, bad cable detection engine 350 may determine whether a frequency of cold restarts of the particular client-side device connected to the particular port of the particular network device via the cable is greater than the other client-side devices connected to different ports of the particular network device via different cables.

As another example, behavior data 340 is representative of disconnection of the particular client-side device from cloud-based services with self-recovery. There are different reasons that the particular client-side device may lose connection to the cloud, such as misconfiguration, firewall blocking, DHCP failure, etc. A bad cable issue may cause connectivity issues resulting in the particular client-side device disconnecting from the cloud or cloud-based services. In the case where the cloud disconnect is caused by a bad cable issue, the particular client-side device typically self-recovers within a short interval. As such, cloud disconnect with self-recovery observed at the particular client-side device may be indicative of a bad cable issue. Bad cable detection engine 370 may determine one or more features of the cloud disconnect with self-recovery behavior, including determining a number of disconnections of the particular client-side device during the window of time, and determining an average, a minimum, and a maximum interval time between the disconnections and subsequent self-recovery of the particular client-side device during the window of time.

Bad cable detection engine 370 monitors the above described behaviors over the window of time, e.g., the last X days, from each client-side device (e.g., APs 142 and wired IoT devices) at a site 102, and extracts the different features from each behavior. Bad cable detection engine 370 may be configured to apply the collected behavior data 340 from a particular client-side device to ML model 380 as input, and determine, as output from ML model 380, whether the features of behavior data 340 over the window of time are indicative of a bad cable issue at a particular port of a particular network device to which the particular client-side device is connected via a cable.

In some examples, ML model 380 may comprise a supervised ML model that is trained using training data comprising pre-collected, labeled behavior data received from client-side devices (e.g., APs and/or other wired client-side devices). The supervised ML model may comprise one of a logistical regression, naïve Bayesian, support vector machine (SVM), or the like. The training data may include sets of behavior data each labeled as being indicative of a bad cable issue or no bad cable issue. In this example, ML model 380 comprises a supervised ML model that is trained using labeled sets of behavior data because the features of the pre-collected behavior data may be indicative of other network error conditions besides bad cable issues. In other examples, ML model 380 may comprise an unsupervised ML model. Although not shown in FIG. 3, in some examples, database 318 may store the training data and VNA/AI engine 350 or a dedicated training module may be configured to train ML model 380 based on the training data to determine appropriate weights across the one or more features of the training data.

In the case of a bad cable issue being detected, VNA/AI engine 350 outputs a bad cable notification, e.g., to an administrator (e.g., admin 150 via UI device 152 of FIG. 1A) of an entity that owns or has access to the particular wired network device. The bad cable notification includes identification information of the particular port and the particular network device such that the administrator may easily initiate a cable test or a cable replacement at the particular network device. In some examples, VNA/AI engine 350 may determine a recommended action based on the detected bad cable issue. The bad cable notification may then include the recommended action to test and/or replace the cable connected to the particular port of the particular network device identified in the bad cable notification. VNA/AI engine 350 may output the bad cable notification via one or more of user interface 310, API 320, webhooks, or email via communication interface 330 for display on the UI device of the administrator.

Figure 4:
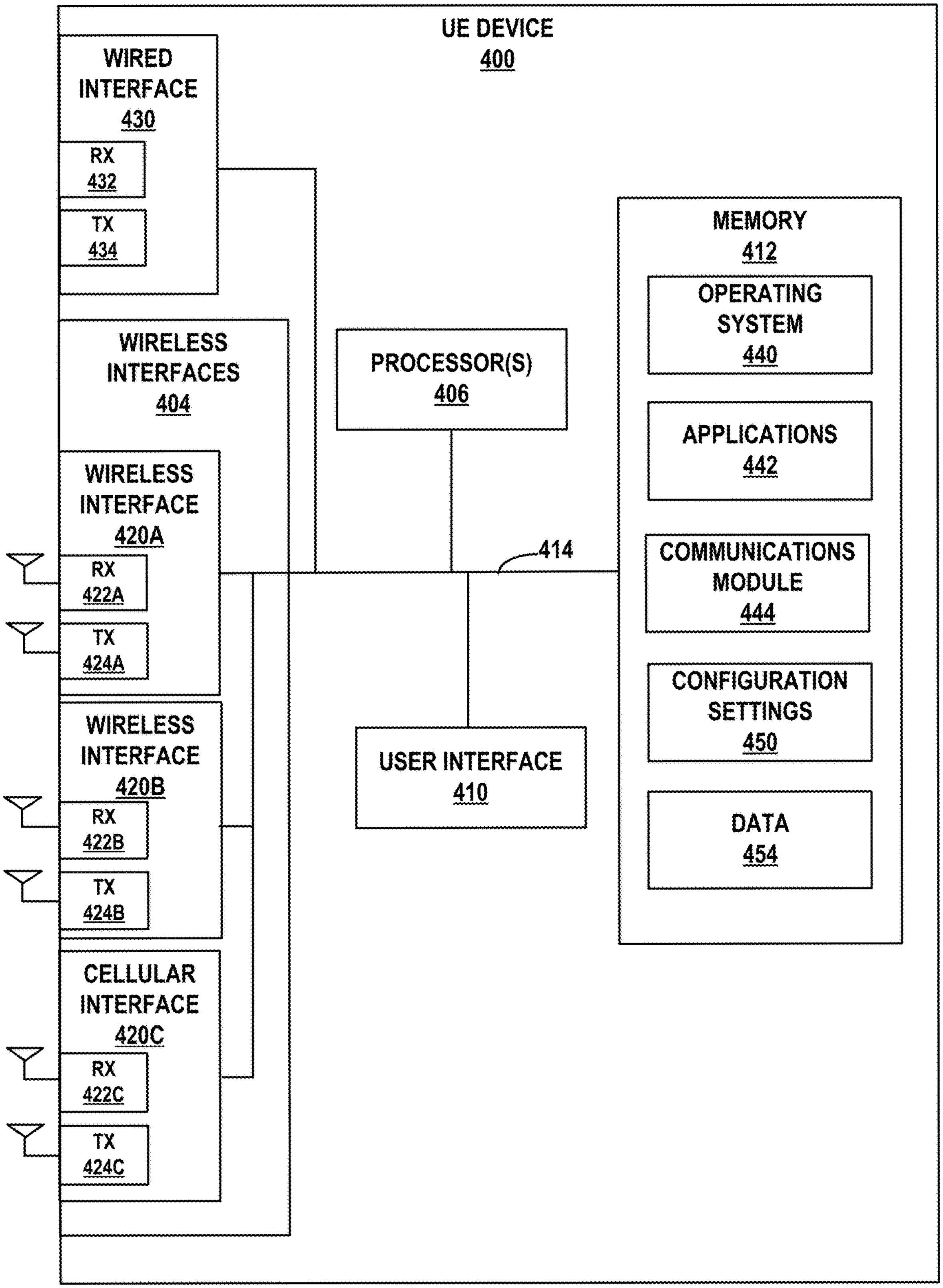
FIG. 4 is a block diagram of an example user equipment device, in accordance with one or more techniques of this disclosure.

FIG. 4 shows an example user equipment (UE) device 400. Example UE device 400 shown in FIG. 4 may be used to implement any of UEs 148 as shown and described herein with respect to FIG. 1A. UE device 400 may include any type of wireless client device, and the disclosure is not limited in this respect. For example, UE device 400 may include a mobile device such as a smart phone, tablet or laptop computer, a personal digital assistant (PDA), a wireless terminal, a smart watch, a smart ring, or any other type of mobile or wearable device. In accordance with techniques described in this disclosure, UE 400 may also include a wired client-side device, e.g., an IoT device such as a printer, a security sensor or device, an environmental sensor, or any other device connected to the wired network and configured to communicate over one or more wireless networks.

UE device 400 includes a wired interface 430, wireless interfaces 420A-420C, one or more processor(s) 406, memory 412, and a user interface 410. The various elements are coupled together via a bus 414 over which the various elements may exchange data and information. Wired interface 430 represents a physical network interface and includes a receiver 432 and a transmitter 434. Wired interface 430 may be used, if desired, to couple, either directly or indirectly, UE 400 to a wired network device, such as one of switches 146 of FIG. 1A, within the wired network via a cable, such as one of Ethernet cables 144 of FIG. 1A.

First, second and third wireless interfaces 420A, 420B, and 420C include receivers 422A, 422B, and 422C, respectively, each including a receive antenna via which UE 400 may receive wireless signals from wireless communications devices, such as APs 142 of FIG. 1A, AP 200 of FIG. 2, other UEs 148, or other devices configured for wireless communication. First, second, and third wireless interfaces 420A, 420B, and 420C further include transmitters 424A, 424B, and 424C, respectively, each including transmit antennas via which UE 400 may transmit wireless signals to wireless communications devices, such as APs 142 of FIG. 1A, AP 200 of FIG. 2, other UEs 148 and/or other devices configured for wireless communication. In some examples, first wireless interface 420A may include a Wi-Fi 802.11 interface (e.g., 2.4 GHz and/or 5 GHZ) and second wireless interface 420B may include a Bluetooth interface and/or a Bluetooth Low Energy interface. Third wireless interface 420C may include, for example, a cellular interface through which UE device 400 may connect to a cellular network.

Processor(s) 406 execute software instructions, such as those used to define a software or computer program, stored to a computer-readable storage medium (such as memory 412), such as non-transitory computer-readable mediums including a storage device (e.g., a disk drive, or an optical drive) or a memory (such as Flash memory or RAM) or any other type of volatile or non-volatile memory, that stores instructions to cause the one or more processors 406 to perform the techniques described herein.

Memory 412 includes one or more devices configured to store programming modules and/or data associated with operation of UE 400. For example, memory 412 may include a computer-readable storage medium, such as non-transitory computer-readable mediums including a storage device (e.g., a disk drive, or an optical drive) or a memory (such as Flash memory or RAM) or any other type of volatile or non-volatile memory, that stores instructions to cause the one or more processor(s) 406 to perform the techniques described herein.

In this example, memory 412 includes an operating system 440, applications 442, a communications module 444, configuration settings 450, and data storage 454. Data storage 454 may include, for example, a status/error log including a list of events specific to UE 400. The events may include a log of both normal events and error events according to a logging level based on instructions from NMS 130. Data storage 454 may store any data used and/or generated by UE 400, such as data used to calculate one or more SLE metrics or identify relevant behavior data, that is collected by UE 400 and either transmitted directly to NMS 130 or transmitted to any of APs 142 in a wireless network 106 for further transmission to NMS 130.

As described herein, UE 400 may measure and report network event data, including behavior data, from data storage 454 to NMS 130. The behavior data may include data representative of different types of behavior observed at UE 400. For example, the different types of behavior may include one or more of error packets on wired interface 430 connected to a network device via a cable, negotiated link speed flapping over the cable, cold restart of UE 400 due to a power outage, or disconnection of UE 400 from cloud-based services with subsequent self-recovery. NMS 130 identifies the relevant behavior data from the network event data received from the wired client-side devices in a wireless network, and stores the behavior data as client-side behavior data 139 (FIG. 1A).

Communications module 444 includes program code that, when executed by processor(s) 406, enables UE 400 to communicate using any of wired interface(s) 430, wireless interfaces 420A-420B and/or cellular interface 450C. Configuration settings 450 include any device settings for UE 400 settings for each of wireless interface(s) 420A-420B and/or cellular interface 420C.

Figure 5:
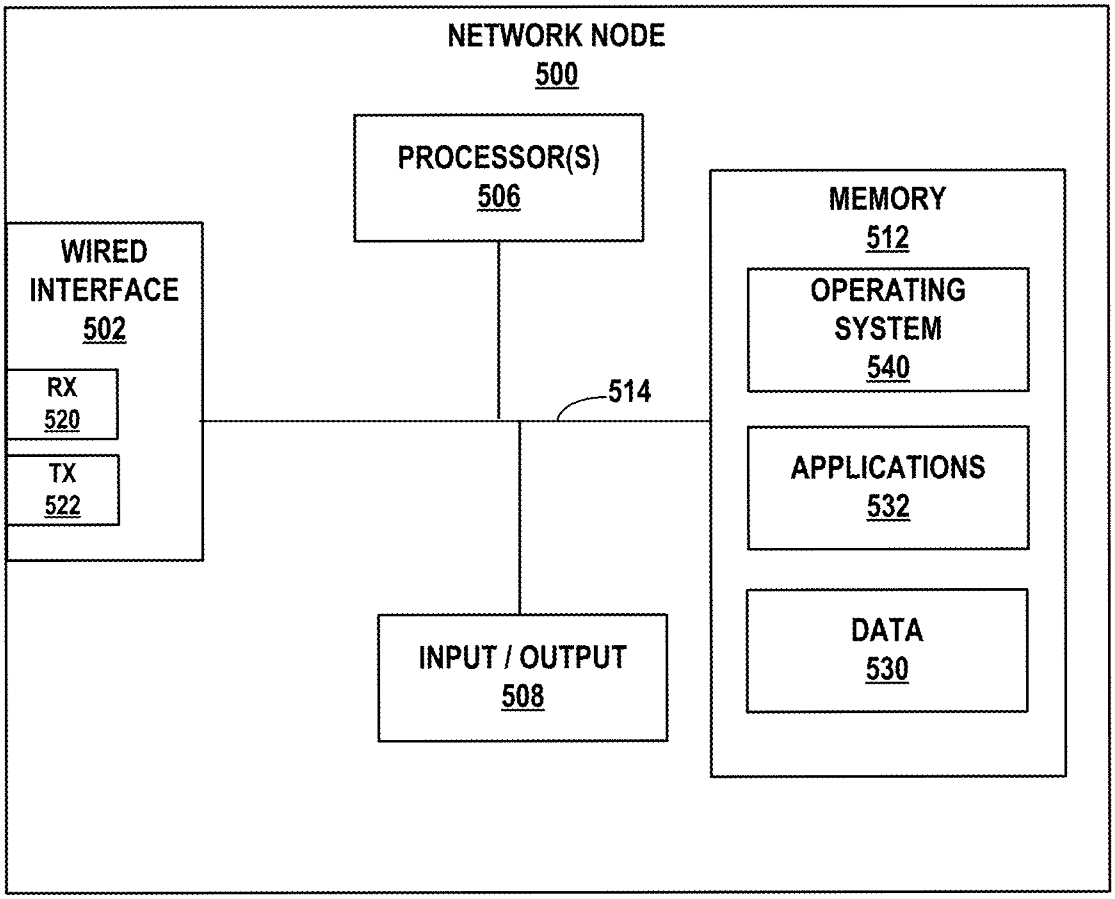
FIG. 5 is a block diagram of an example network node, such as a router or switch, in accordance with one or more techniques of this disclosure.

FIG. 5 is a block diagram illustrating an example network node 500 configured according to the techniques described herein. In one or more examples, the network node 500 implements a device or a server attached to the network 134 of FIG. 1, e.g., router, switch, AAA server, DHCP server, DNS server, VNA, Web server, etc., or a network device such as, e.g., routers, switches, or the like. In some embodiments, network node 400 of FIG. 4 is server 110, 116, 122, 128, of FIG. 1A, switch 146 of FIG. 1A, or other routers or switches of network 134 of FIG. 1A.

In this example, network node 500 includes a wired interface 502, e.g., an Ethernet interface, a processor 506, input/output 508, e.g., display, buttons, keyboard, keypad, touch screen, mouse, etc., and a memory 512 coupled together via a bus 514 over which the various elements may interchange data and information. Wired interface 502 couples the network node 500 to a network, such as an enterprise network. Though only one interface is shown by way of example, those skilled in the art should recognize that network nodes may, and usually do, have multiple communication interfaces and/or multiple communication interface ports. Wired interface 502 includes a receiver 520 and a transmitter 522. In examples where network node 500 comprises a server, network node 500 may receive data and information, e.g., including operation related information, e.g., registration request, AAA services, DHCP requests, Simple Notification Service (SNS) look-ups, and Web page requests via receiver 520, and send data and information, e.g., including configuration information, authentication information, web page data, etc. via transmitter 522.

In examples where network node 500 comprises a wired network device, network node 500 may be connected via wired interface 502 to one or more APs or other wired client-side devices, e.g., IoT devices, within a wired network edge. For example, network node 500 may include multiple wired interfaces 502 and/or wired interface 502 may include multiple physical ports to connect to multiple APs or the other wired-client-side devices within a site via respective Ethernet cables. In some examples, each of the APs or other wired client-side devices connected to network node 500 may access the wired network via wired interface 502 of network node 500. In some examples, one or more of the APs or other wired client-side devices connected to network node 500 may each draw power from network node 500 via the respective Ethernet cable and a Power over Ethernet (POE) port of wired interface 502.

Memory 512 stores executable software applications 532, operating system 540 and data/information 530. Data 530 may include a system log and/or an error log that stores event data, including behavior data, for network node 500. In examples where network node 500 comprises a "third-party" wired network device, the same entity does not own or have access to both the APs or wired client-side devices and network node 500. As such, in this example, NMS 130 does not receive, collect, or otherwise have access to the event data, including the behavior data, from network node 500.

Figure 6:
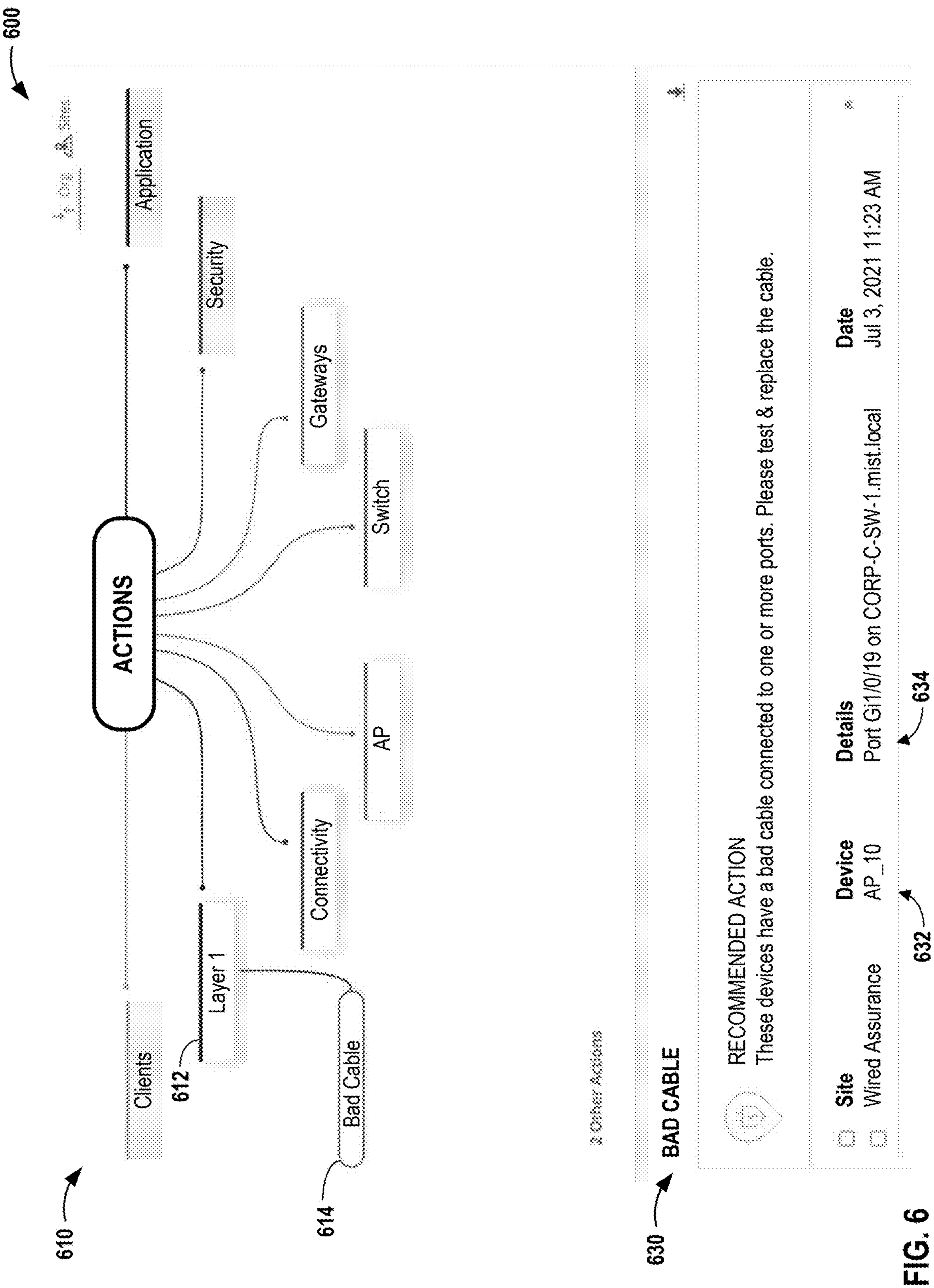
FIG. 6 illustrates an example user interface of the network management system for display on a user interface device of an administrator, in accordance with the techniques of this disclosure.

FIG. 6 illustrates an example user interface 600 of the network management system (NMS) 130/300 for display on a user interface device of an administrator (e.g., UI device 152 of admin 150 of FIG. 1A), in accordance with the techniques of this disclosure. As illustrated, user interface 600 includes an Action card 610 and a Bad Cable card 630. Action card 610 may indicate multiple recommended actions automatically determined by NMS 130/300 to address wireless network issues. These actions may be displayed to the administrator broken down into different categories associated with different portions of the network system, e.g., Clients, Layer 1 612, Connectivity, AP, Switch, Gateways, Security, and Application. As illustrated in FIG. 6, upon selection of the Layer 1 612 category by the administrator, a sub-category Bad Cable 614 is displayed indicative of a detected bad cable issue and associated recommended action.

Bad Cable card 630 comprises one example of the bad cable notification sent to the administrator in according with the disclosed techniques. As illustrated, Bad Cable card 630 includes identification of a client-side device 632, e.g., Jon_10 (AP), identification of a particular port and a particular network device 634, e.g., Port Gi1/0/19 on CORP-C-SW-1.mist.local, and a date and/or time of the potential bad cable detection. Bad Cable card 630 also includes a written recommended action to test and replace the cable between the identified client-side device 632 and the identified port and identified network device 634. Upon receipt of Bad Cable card 630, the administrator may initiate a cable test and/or initiate a cable replacement at the identified port of the network device 634.

Figure 7:
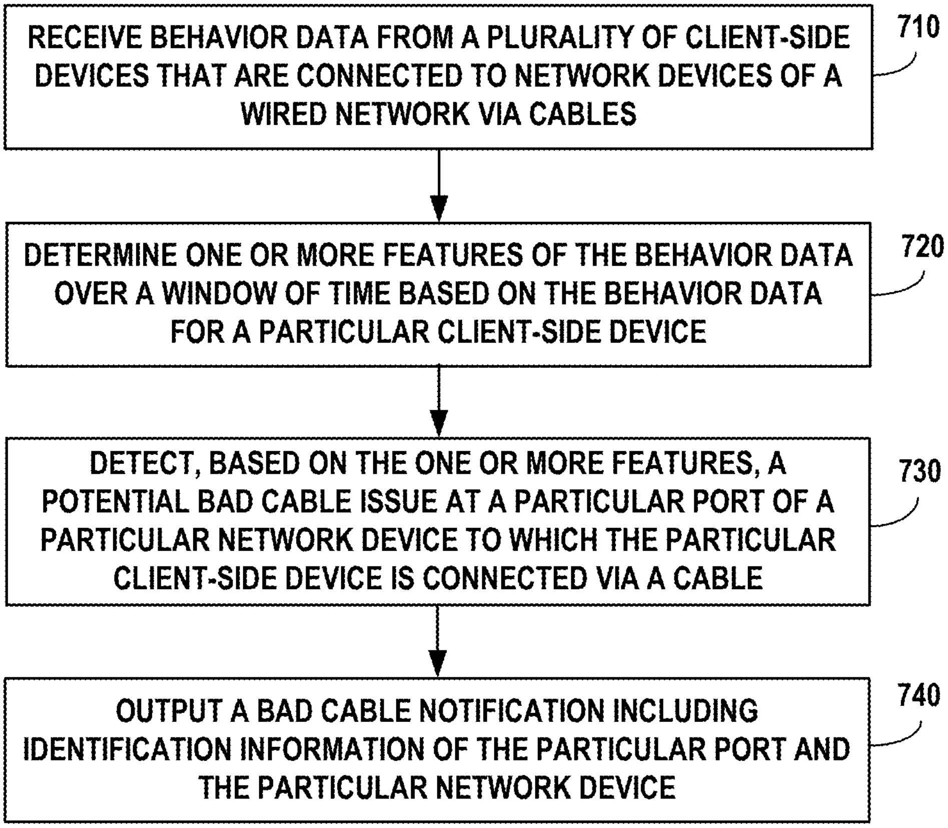
FIG. 7 is a flow chart illustrating an example operation by which the network management system monitors and assesses client-side behavior data to detect potential bad cable issues at network devices, in accordance with the techniques of this disclosure.

FIG. 7 is a flow chart illustrating an example operation by which the network management system monitors and assesses client-side behavior data to detect potential bad cable issues at network devices, in accordance with the techniques of this disclosure. The example operation of FIG. 7 is described herein with respect to NMS 300, VNA/AI engine 350, and bad cable detection engine 370 of FIG. 3.

In other examples, the operation of FIG. 7 may be performed by other computing systems or devices configured to monitor and assess client-side behavior data, such as NMS 130, VNA 133, and bad cable detection engine 135 from FIGS. 1A-1B.

NMS 300 receives behavior data from the plurality of client-side devices, wherein the plurality of client-side devices are connected to one or more network devices of the wired network via respective cables (710). The plurality of client-side devices may include one or more of AP devices, e.g., AP devices 142 from FIG. 1, configured to provide wireless network access to one or more client devices, e.g., UEs 148 from FIG. 1, at a site, e.g., one or sites 102 from FIG. 1, or wired IoT devices at the site. In some examples, the one or more network devices are considered "third-party" network devices because NMS 300 does not receive behavior data for the one or more network devices.

Bad cable detection engine 370 executed by VNA/AI engine 350 of NMS 300 determines one or more features of the behavior data over a window of time based on the behavior data for a particular client-side device (720). The behavior data for the particular client-side device includes data representative of different types of behavior observed at the particular client-side device, the different types of behavior including one or more of error packets on an interface of the particular client-side device to which a cable is connected, negotiated link speed flapping over the cable, cold restart of the particular client-side device due to a power outage, or disconnection of the particular client-side device from cloud-based services with self-recovery. In order to determine the one or more features of the behavior data, bad cable detection engine 370 may determine one or more of a quantity, a frequency, or a variance over the window of time for each type of behavior included in the behavior data.

Bad cable detection engine 370 detects, based on the one or more features of the behavior data over the window of time, a potential bad cable issue at a particular port of a particular network device to which the particular client-side device is connected via a cable (730). In examples where the one or more network devices are considered "third-party" network devices such that NMS 300 does not receive behavior data for the one or more network devices, bad cable detection engine 370 detects the potential bad cable issue at the particular port of the particular network device based only on the one or more features of the behavior data over the window of time for the particular client-side device. In some examples, the cable comprises an Ethernet cable, and the potential bad cable issue comprises one of a loose, disconnected, or broken Ethernet cable between the particular client-side device and the particular port of the particular network device. In order to detect the potential bad cable issue, bad cable detection engine 370 may apply the behavior data for the particular client-side device to a ML model 380 as input, and determine, as output from ML model 380, whether the one or more features of the behavior data over the window of time are indicative of the potential bad cable issue at the particular port of the particular network device to which the particular client-side device is connected via the cable.

VNA/AI engine 350 then outputs a bad cable notification including identification information of the particular port and the particular network device (740). VNA/AI engine 350 may output the bad cable notification via one or more of a user interface 310, API 320, webhook, or email for display on a user interface device of an administrator associated with the particular network device. In some examples, VNA/AI engine 350 may determine a recommended action to either test or replace the cable between the particular client-side device and the particular port of the particular network device based on the detected potential bad cable issue. The bad cable notification may then include the recommended action for the cable between the particular client-side device and the particular port of the particular network device identified in the bad cable notification.

The techniques described herein may be implemented using software, hardware and/or a combination of software and hardware. Various examples are directed to apparatus, e.g., mobile nodes, mobile wireless terminals, base stations, e.g., access points, communications system. Various examples are also directed to methods, e.g., method of controlling and/or operating a communications device, e.g., wireless terminals (UEs), base stations, control nodes, access points and/or communications systems. Various examples are also directed to non-transitory machine, e.g., computer, readable medium, e.g., ROM, RAM, CDs, hard discs, etc., which include machine readable instructions for controlling a machine to implement one or more steps of a method.

It is understood that the specific order or hierarchy of steps in the processes disclosed is an example of example approaches. Based upon design preferences, it is understood that the specific order or hierarchy of steps in the processes may be rearranged while remaining within the scope of the present disclosure. The accompanying method claims present elements of the various steps in a sample order and are not meant to be limited to the specific order or hierarchy presented.

In various examples devices and nodes described herein are implemented using one or more modules to perform the steps corresponding to one or more methods, for example, signal generation, transmitting, processing, and/or receiving steps. Thus, in some examples various features are implemented using modules. Such modules may be implemented using software, hardware or a combination of software and hardware. In some examples each module is implemented as an individual circuit with the device or system including a separate circuit for implementing the function corresponding to each described module. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various examples are directed to a machine-readable medium e.g., a non-transitory computer readable medium, including machine executable instructions for causing a machine, e.g., processor and associated hardware, to perform one or more of the steps of the above-described method(s). Some examples are directed to a device including a processor configured to implement one, multiple, or all of the steps of one or more methods of the one example aspect.

In some examples, the processor or processors, e.g., CPUs, of one or more devices, e.g., communications devices such as wireless terminals (UEs), and/or access nodes, are configured to perform the steps of the methods described as being performed by the devices. The configuration of the processor may be achieved by using one or more modules, e.g., software modules, to control processor configuration and/or by including hardware in the processor, e.g., hardware modules, to perform the recited steps and/or control processor configuration. Accordingly, some but not all examples are directed to a communications device, e.g., user equipment, with a processor which includes a module corresponding to each of the steps of the various described methods performed by the device in which the processor is included. In some but not all examples a communications device includes a module corresponding to each of the steps of the various described methods performed by the device in which the processor is included. The modules may be implemented purely in hardware, e.g., as circuits, or may be implemented using software and/or hardware or a combination of software and hardware.

Some examples are directed to a computer program product comprising a computer-readable medium comprising code for causing a computer, or multiple computers, to implement various functions, steps, acts and/or operations, e.g., one or more steps described above. In some examples, the computer program product can, and sometimes does, include different code for each step to be performed. Thus, the computer program product may, and sometimes does, include code for each individual step of a method, e.g., a method of operating a communications device, e.g., a wireless terminal or node. The code may be in the form of machine, e.g., computer, executable instructions stored on a computer-readable medium such as a RAM (Random Access Memory), ROM (Read Only Memory) or other type of storage device. In addition to being directed to a computer program product, some examples are directed to a processor configured to implement one or more of the various functions, steps, acts and/or operations of one or more methods described above. Accordingly, some examples are directed to a processor, e.g., CPU, graphical processing unit (GPU), digital signal processing (DSP) unit, etc., configured to implement some or all of the steps of the methods described herein. The processor may be for use in, e.g., a communications device or other device described in the present application.

Numerous additional variations on the methods and apparatus of the various examples described above will be apparent to those skilled in the art in view of the above description. Such variations are to be considered within the scope of this disclosure. The methods and apparatus may be, and in various examples are, used with BLE, LTE, CDMA, orthogonal frequency division multiplexing (OFDM), and/or various other types of communications techniques which may be used to provide wireless communications links between access nodes and mobile nodes. In some examples the access nodes are implemented as base stations which establish communications links with user equipment devices, e.g., mobile nodes, using OFDM and/or CDMA. In various examples the mobile nodes are implemented as notebook computers, personal data assistants (PDAs), or other portable devices including receiver/transmitter circuits and logic and/or routines, for implementing the methods.

In the detailed description, numerous specific details are set forth in order to provide a thorough understanding of some examples. However, it will be understood by persons of ordinary skill in the art that some examples may be practiced without these specific details. In other instances, well-known methods, procedures, components, units and/or circuits have not been described in detail so as not to obscure the discussion.

Some examples may be used in conjunction with various devices and systems, for example, a User Equipment (UE), a Mobile Device (MD), a wireless station (STA), a wireless terminal (WT), a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some examples may be used in conjunction with devices and/or networks operating in accordance with existing Wireless-Gigabit-Alliance (WGA) specifications (Wireless Gigabit Alliance, Inc. WiGig MAC and PHY Specification Version 1.1, April 2011, Final specification) and/or future versions and/or derivatives thereof, devices and/or networks operating in accordance with existing IEEE 802.11 standards (IEEE 802.11-2012, IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012; IEEE802.11ac-2013 ("IEEE P802.11ac-2013, IEEE Standard for Information Technology-Telecommunications and Information Exchange Between Systems Local and Metropolitan Area Networks-Specific Requirements-Part 11: Wireless LAN Medium Access Control (MAC) and Physical Layer (PHY) Specifications-Amendment 4: Enhancements for Very High Throughput for Operation in Bands below 6 GHz", December 2013); IEEE 802.11ad ("IEEE P802.11ad-2012, IEEE Standard for Information Technology-Telecommunications and Information Exchange Between Systems-Local and Metropolitan Area Networks-Specific Requirements-Part 11: Wireless LAN Medium Access Control (MAC) and Physical Layer (PHY) Specifications-Amendment 3: Enhancements for Very High Throughput in the 60 GHz Band", 28 Dec. 2012); IEEE-802.11REVmc ("IEEE 802.11-REVmc™/D3.0, June 2014 draft standard for Information technology—Telecommunications and information exchange between systems Local and metropolitan area networks Specific requirements; Part 11: Wireless LAN Medium Access Control (MAC) and Physical Layer (PHY) Specification"); IEEE802.11-ay (P802.11ay Standard for Information Technology—Telecommunications and Information Exchange Between Systems Local and Metropolitan Area Networks—Specific Requirements Part 11: Wireless LAN Medium Access Control (MAC) and Physical Layer (PHY) Specifications—Amendment: Enhanced Throughput for Operation in License-Exempt Bands Above 45 GHZ)), IEEE 802.11-2016 and/or future versions and/or derivatives thereof, devices and/or networks operating in accordance with existing Wireless Fidelity (Wi-Fi) Alliance (WFA) Peer-to-Peer (P2P) specifications (Wi-Fi P2P technical specification, version 1.5, August 2014) and/or future versions and/or derivatives thereof, devices and/or networks operating in accordance with existing cellular specifications and/or protocols, e.g., 3rd Generation Partnership Project (3GPP), 3GPP Long Term Evolution (LTE) and/or future versions and/or derivatives thereof, units and/or devices which are part of the above networks, or operate using any one or more of the above protocols, and the like.

Some examples may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some examples may be used in conjunction with one or more types of wireless communication signals and/or systems, for example, Radio Frequency (RF), Infra-Red (IR), Frequency-Division Multiplexing (FDM), Orthogonal FDM (OFDM), Orthogonal Frequency-Division Multiple Access (OFDMA), FDM Time-Division Multiplexing (TDM), Time-Division Multiple Access (TDMA), Multi-User MIMO (MU-MIMO), Spatial Division Multiple Access (SDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G), or Sixth Generation (6G) mobile networks, 3GPP, Long Term Evolution (LTE), LTE advanced, Enhanced Data rates for GSM Evolution (EDGE), or the like. Other examples may be used in various other devices, systems and/or networks.

Some demonstrative examples may be used in conjunction with a WLAN (Wireless Local Area Network), e.g., a Wi-Fi network. Other examples may be used in conjunction with any other suitable wireless communication network, for example, a wireless area network, a "piconet", a WPAN, a WVAN, and the like.

Some examples may be used in conjunction with a wireless communication network communicating over a frequency band of 2.4 Ghz, 5 GHz and/or 60 GHz. However, other examples may be implemented utilizing any other suitable wireless communication frequency band(s), for example, an Extremely High Frequency (EHF) band (the millimeter wave (mmWave) frequency band), e.g., a frequency band within the frequency band of between 20 GhH and 300 GHz, a WLAN frequency band, a WPAN frequency band, a frequency band according to the WGA specification, and the like.

While the above provides just some simple examples of the various device configurations, it is to be appreciated that numerous variations and permutations are possible. Moreover, the technology is not limited to any specific channels, but is generally applicable to any frequency range(s)/channel(s). Moreover, and as discussed, the technology may be useful in the unlicensed spectrum.

Although examples are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, a communication system or subsystem, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although examples are not limited in this regard, the terms "plurality" and "a plurality" as used herein may include, for example, "multiple" or "two or more." The terms "plurality" or "a plurality" may be used throughout the specification to describe two or more components, devices, elements, units, parameters, circuits, or the like. For example, "a plurality of stations" may include two or more stations.

It may be advantageous to set forth definitions of certain words and phrases used throughout this document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, interconnected with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, circuitry, firmware or software, or some combination of at least two of the same. It should be noted that the functionality associated with any particular controller may be centralized or distributed, whether locally or remotely. Definitions for certain words and phrases are provided throughout this document and those of ordinary skill in the art should understand that in many, if not most instances, such definitions apply to prior, as well as future uses of such defined words and phrases.

The examples have been described in relation to communications systems, as well as protocols, techniques, means and methods for performing communications, such as in a wireless network, or in general in any communications network operating using any communications protocol(s). Examples of such are home or access networks, wireless home networks, wireless corporate networks, and the like. It should be appreciated however that in general, the systems, methods and techniques disclosed herein will work equally well for other types of communications environments, networks and/or protocols.

For purposes of explanation, numerous details are set forth in order to provide a thorough understanding of the present techniques. It should be appreciated however that the present disclosure may be practiced in a variety of ways beyond the specific details set forth herein. Furthermore, while the examples illustrated herein show various components of the system collocated, it is to be appreciated that the various components of the system can be located at distant portions of a distributed network, such as a communications network, node, within a Domain Master, and/or the Internet, or within a dedicated secured, unsecured, and/or encrypted system and/or within a network operation or management device that is located inside or outside the network. As an example, a Domain Master can also be used to refer to any device, system or module that manages and/or configures or communicates with any one or more aspects of the network or communications environment and/or transceiver(s) and/or stations and/or access point(s) described herein.

Thus, it should be appreciated that the components of the system can be combined into one or more devices, or split between devices, such as a transceiver, an access point, a station, a Domain Master, a network operation or management device, a node or collocated on a particular node of a distributed network, such as a communications network. As will be appreciated from the following description, and for reasons of computational efficiency, the components of the system can be arranged at any location within a distributed network without affecting the operation thereof. For example, the various components can be located in a Domain Master, a node, a domain management device, such as a MIB, a network operation or management device, a transceiver(s), a station, an access point(s), or some combination thereof. Similarly, one or more of the functional portions of the system could be distributed between a transceiver and an associated computing device/system.

Furthermore, it should be appreciated that the various links, including any communications channel(s)/elements/lines connecting the elements, can be wired or wireless links or any combination thereof, or any other known or later developed element(s) capable of supplying and/or communicating data to and from the connected elements. The term module as used herein can refer to any known or later developed hardware, circuitry, software, firmware, or combination thereof, that is capable of performing the functionality associated with that element. The terms determine, calculate, and compute and variations thereof, as used herein are used interchangeable and include any type of methodology, process, technique, mathematical operational or protocol.

Moreover, while some of the examples described herein are directed toward a transmitter portion of a transceiver performing certain functions, or a receiver portion of a transceiver performing certain functions, this disclosure is intended to include corresponding and complementary transmitter-side or receiver-side functionality, respectively, in both the same transceiver and/or another transceiver(s), and vice versa.

The examples are described in relation to enhanced communications. However, it should be appreciated, that in general, the systems and methods herein will work equally well for any type of communication system in any environment utilizing any one or more protocols including wired communications, wireless communications, powerline communications, coaxial cable communications, fiber optic communications, and the like.

The example systems and methods are described in relation to IEEE 802.11 and/or Bluetooth® and/or Bluetooth® Low Energy transceivers and associated communication hardware, software, and communication channels. However, to avoid unnecessarily obscuring the present disclosure, the following description omits well-known structures and devices that may be shown in block diagram form or otherwise summarized.

While the above-described flowcharts have been discussed in relation to a particular sequence of events, it should be appreciated that changes to this sequence can occur without materially effecting the operation of the example(s). Additionally, the example techniques illustrated herein are not limited to the specifically illustrated examples but can also be utilized with the other examples and each described feature is individually and separately claimable.

The above-described system can be implemented on a wireless telecommunications device(s)/system, such an IEEE 802.11 transceiver, or the like. Examples of wireless protocols that can be used with this technology include IEEE 802.11a, IEEE 802.11b, IEEE 802.11g, IEEE 802.11n, IEEE 802.11ac, IEEE 802.11ad, IEEE 802.11af, IEEE 802.11ah, IEEE 802.11ai, IEEE 802.11aj, IEEE 802.11aq, IEEE 802.11ax, Wi-Fi, LTE, 4G, Bluetooth®, WirelessHD, WiGig, WiGi, 3GPP, Wireless LAN, WiMAX, DensiFi SIG, Unifi SIG, 3GPP LAA (licensed-assisted access), and the like.

Additionally, the systems, methods and protocols can be implemented to improve one or more of a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, a modem, a transmitter/receiver, any comparable means, or the like. In general, any device capable of implementing a state machine that is in turn capable of implementing the methodology illustrated herein can benefit from the various communication methods, protocols, and techniques according to the disclosure provided herein.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, Broadcom® AirForce BCM4704/BCM4703 wireless networking processors, the AR7100 Wireless Network Processing Unit, other industry-equivalent processors, and may perform computational functions using any known or future-developed standard, instruction set, libraries, and/or architecture.

Furthermore, the disclosed methods may be readily implemented in software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with the examples is dependent on the speed and/or efficiency requirements of the system, the particular function, and the particular software or hardware systems or microprocessor or microcomputer systems being utilized. The communication systems, methods and protocols illustrated herein can be readily implemented in hardware and/or software using any known or later developed systems or structures, devices and/or software by those of ordinary skill in the applicable art from the functional description provided herein and with a general basic knowledge of the computer and telecommunications arts.

Moreover, the disclosed techniques may be readily implemented in software and/or firmware that can be stored on a storage medium to improve the performance of a programmed general-purpose computer with the cooperation of a controller and memory, a special purpose computer, a microprocessor, or the like. In these instances, the systems and methods can be implemented as program embedded on personal computer such as an applet, JAVA® or CGI script, as a resource residing on a server or computer workstation, as a routine embedded in a dedicated communication system or system component, or the like. The system can also be implemented by physically incorporating the system and/or method into a software and/or hardware system, such as the hardware and software systems of a communications transceiver.

It is therefore apparent that there have at least been provided systems and methods for enhancing and improving conversational user interface. Many alternatives, modifications and variations would be or are apparent to those of ordinary skill in the applicable arts. Accordingly, this disclosure is intended to embrace all such alternatives, modifications, equivalents, and variations that are within the spirit and scope of this disclosure.

What is claimed is:

1. A network management system comprising:

one or more processors; and memory comprising instructions executable by the one or more processors to cause the network management system to:

obtain behavior data for a plurality of access point (AP) devices at a site that are managed by the network management system, wherein the plurality of AP devices provide wireless network access to one or more client devices at the site and are connected via respective cables to one or more network devices of a wired network at the site that are not managed by the network management system;

determine one or more features of the behavior data for an AP device of the plurality of AP devices, wherein the one or more features are indicative of physical connectivity of the AP device to the one or more network devices;

detect, based on the one or more features of the behavior data for the AP device, an issue with the physical connectivity of the AP device to a network device of the one or more network devices to which the AP device is connected via a cable; and output a notification including identification information of the network device.

2. The network management system of claim 1, wherein the network management system does not obtain behavior data for the one or more network devices, and wherein to detect the issue, the instructions further cause the network management system to detect the issue at the network device based only on the one or more features of the behavior data for the AP device.

3. The network management system of claim 1, wherein the cable comprises an Ethernet cable, and wherein the issue comprises one of a loose, disconnected, or broken Ethernet cable between the AP device and the network device.

4. The network management system of claim 1, wherein the behavior data for the AP device includes event data representative of different types of behavior observed at the AP device that are indicative of the physical connectivity to the one or more network devices, and wherein the different types of behavior observed at the AP device include one or more of error packets on an interface of the AP device to which the cable is connected, negotiated link speed flapping of the AP device over the cable, cold restart of the AP device due to a power outage, or disconnection of the AP device from cloud-based services with self-recovery.

5. The network management system of claim 1, wherein the behavior data for the AP device includes event data representative of different types of behavior observed at the AP device that are indicative of the physical connectivity to the one or more network devices, and wherein to determine the one or more features of the behavior data, the instructions further cause the network management system to determine one or more of a quantity, a frequency, or a variance over a window of time for each type of behavior included in the behavior data.

6. The network management system of claim 5, wherein the behavior data is representative of error packets on an interface of the AP device to which the cable is connected, and wherein to determine the one or more features of the behavior data, the instructions further cause the network management system to:

determine a percentage of packets identified as error packets on the interface of the AP device during the window of time, wherein the error packets are indicative of a plurality of different types of interface packet errors; and determine a percentage of packets identified as relevant error packets on the interface of the AP device during the window of time, wherein the relevant error packets are indicative of one or more types of the interface packet errors that are more relevant to the issue with the physical connectivity to the network device via the cable than the other types of interface packet errors.

7. The network management system of claim 6, wherein the one or more types of the interface packet errors that are more relevant to the issue with the physical connectivity to the network device via the cable than the other types of interface packet errors may be learned automatically via a machine learning-based feature correlation analysis.

8. The network management system of claim 5, wherein the behavior data is representative of negotiated link speed flapping of the AP device over the cable in which link speed over the cable jumps between a low link speed and a negotiated maximum link speed, and wherein to determine the one or more features of the behavior data, the instructions further cause the network management system to:

determine a number of link speed flaps over the cable during the window of time; and determine an average, a minimum, and a maximum interval time between the link speed flaps over the cable during the window of time.

9. The network management system of claim 5, wherein the AP device draws power via the cable from the network device, wherein the behavior data is representative of cold restart of the AP device due to a power outage, and wherein to determine the one or more features of the behavior data, the instructions further cause the network management system to:

determine a number of cold restarts of the AP device during the window of time; and determine a variance of interval time between the cold restarts of the AP device during the window of time, wherein the variance may indicate a burst pattern of cold restarts or a smooth pattern of cold restarts.

10. The network management system of claim 9, wherein, in addition to the AP device, multiple AP devices of the plurality of AP devices are connected to the network device via the respective cables, and wherein the instructions further cause the network management system to determine whether a frequency of cold restarts of the AP device connected to the network device via the cable is greater than other AP devices of the multiple AP devices connected to the network device via the respective cables.

11. The network management system of claim 5, wherein the behavior data is representative of disconnection of the AP device from cloud-based services with self-recovery, and wherein to determine the one or more features of the behavior data, the instructions further cause the network management system to:

determine a number of disconnections of the AP device during the window of time; and determine an average, a minimum, and a maximum interval time between the disconnections and subsequent self-recovery of the AP device during the window of time.

12. The network management system of claim 1, wherein to detect the issue, the instructions further cause the network management system to:

apply the behavior data for the AP device to a machine learning model as input; and determine, as output from the machine learning model, whether the one or more features of the behavior data are indicative of the issue with the physical connectivity to the network device to which the AP device is connected via the cable.

13. The network management system of claim 1, wherein to output the notification, the instructions further cause the network management system to output the notification via one or more of a user interface, Application Programming Interface (API), webhook, or email for display on a user interface device associated with the network device.

14. The network management system of claim 1, wherein the instructions further cause the network management system to determine a recommended action to either test or replace the cable between the AP device and the network device based on the detected issue with the physical connectivity to the network device via the cable, and wherein the notification includes the recommended action for the cable between the AP device and the network device identified in the notification.

15. A method comprising:

obtaining, by a network management system, behavior data for a plurality of access point (AP) devices at a site that are managed by the network management system, wherein the plurality of AP devices provide wireless network access to one or more client devices at the site and are connected via respective cables to one or more network devices of a wired network at the site that are not managed by the network management system;

determining, by the network management system, one or more features of the behavior data for an AP device of the plurality of AP devices, wherein the one or more features are indicative of physical connectivity of the AP device to the one or more network devices;

detecting, by the network management system and based on the one or more features of the behavior data for the AP device, an issue with the physical connectivity of the AP device to a network device of the one or more network devices to which the AP device is connected via a cable; and outputting, by the network management system, a notification including identification information of the network device.

16. The method of claim 15, wherein the behavior data for the AP device includes event data representative of different types of behavior observed at the AP device that are indicative of the physical connectivity to the one or more network devices, and wherein determining the one or more features of the behavior data comprises determining one or more of a quantity, a frequency, or a variance over a window of time for each type of behavior included in the behavior data.

17. The method of claim 15, wherein detecting the issue comprises:

applying the behavior data for the AP device to a machine learning model as input; and determining, as output from the machine learning model, whether the one or more features of the behavior data are indicative of the issue with the physical connectivity to the network device to which the AP device is connected via the cable.

18. The method of claim 15, further comprising determining a recommended action to either test or replace the cable between the AP device and the network device based on the detected issue with the physical connectivity to the network device via the cable, wherein the notification includes the recommended action for the cable between the AP device and the network device identified in the notification.

19. Non-transitory computer-readable storage media comprising instructions executable by one or more processors to cause a network management system to:

obtain behavior data from a plurality of access point (AP) devices at a site that are managed by the network management system, wherein the plurality of AP devices provide wireless network access to one or more client devices at the site and are connected via respective cables to one or more network devices of a wired network at the site that are not managed by the network management system;

determine one or more features of the behavior data for a AP device of the plurality of AP devices, wherein the one or more features are indicative of physical connectivity of the AP device to the one or more network devices;

detect, based on the one or more features of the behavior data for the AP device, an issue with the physical connectivity of the AP device to a network device of the one or more network devices to which the AP device is connected via a cable; and output a notification including identification information of the network device.

* * * * *